(12) United States Patent
Chekina et al.

(10) Patent No.: US 9,369,476 B2
(45) Date of Patent: Jun. 14, 2016

(54) SYSTEM FOR DETECTION OF MOBILE APPLICATIONS NETWORK BEHAVIOR-NETWISE

(71) Applicant: DEUTSCHE TELEKOM AG, Bonn (DE)

(72) Inventors: Lena Chekina, Omer (IL); Bracha Shapira, Beer Sheva (IL); Dudu Mimran, Tel-Aviv (IL); Yuval Elovici, Moshav Arugot (IL); Christoph Peylo, Damme (DE)

(73) Assignee: Deutsche Telekom AG, Bonn (DE)

( * ) Notice: Subject to any disclaimer, the term of this patent is extended or adjusted under 35 U.S.C. 154(b) by 208 days.

(21) Appl. No.: 14/053,742

(22) Filed: Oct. 15, 2013

(65) Prior Publication Data

US 2014/0113588 A1 Apr. 24, 2014

(30) Foreign Application Priority Data

Oct. 18, 2012 (IL) .......................................... 222530

(51) Int. Cl.
*H04M 3/16* (2006.01)
*H04L 29/06* (2006.01)
(Continued)

(52) U.S. Cl.
CPC .......... *H04L 63/1408* (2013.01); *G06F 21/552* (2013.01); *G06N 5/043* (2013.01);
(Continued)

(58) Field of Classification Search
CPC .... G06F 21/552; G06N 5/043; G06N 99/005; H04L 63/1408; H04L 63/1425; H04W 12/00; H04W 12/12; H04W 4/00; H04W 84/042

USPC .......... 455/410–411, 418–420, 67.11, 550.1; 370/328, 338; 726/24, 22, 23, 25; 709/224
See application file for complete search history.

(56) References Cited

U.S. PATENT DOCUMENTS 5,991,881 A * 11/1999 Conklin et al. .................. 726/22
7,603,710 B2 * 10/2009 Harvey et al. .................. 726/23
(Continued)

OTHER PUBLICATIONS

"Andromaly": "a behavioral malware detection framework for android devices" Asaf Shabtai • Uri Kanonov. Yuvai ElovJci. Chanan Glezer. Yael Weiss; Revised: Oct. 27, 2010 ~) Springer Science+Business Media, I,LC 2011.*
(Continued)

*Primary Examiner* — Babar Sarwar
(74) *Attorney, Agent, or Firm* — Roach Brown McCarthy & Gruber, P.C.; Kevin D. McCarthy

(57) ABSTRACT

The invention is a system for protecting mobile devices in cellular networks from unauthorized harmful applications and for protecting cellular network infrastructure from targeted or benign overloads. The system comprises mobile cellular devices and a cellular network infrastructure. Some of the mobile devices comprise an application manager, which is adapted to manage the aggregation and learning processes, and a detection manager, which is adapted to analyze network behavior and detect deviations. The application manager and the detection manager are adapted to monitor the applications running on a device, learn the patterns of mobile applications network behavior and detect meaningful deviations from the application's observed normal behavior. The cellular network infrastructure comprises a services module, a logic module, and a database access unit adapted for aggregation and analysis of an application's network traffic patterns for numerous users.

8 Claims, 14 Drawing Sheets

(51) Int. Cl.
| | |
|---|---|
| H04W 12/12 | (2009.01) |
| H04W 12/00 | (2009.01) |
| G06F 21/55 | (2013.01) |
| G06N 5/04 | (2006.01) |
| G06N 99/00 | (2010.01) |
| H04W 4/00 | (2009.01) |
| H04W 84/04 | (2009.01) |

(52) U.S. Cl.
CPC ......... *G06N 99/005* (2013.01); *H04L 63/1425* (2013.01); *H04W 12/00* (2013.01); *H04W 12/12* (2013.01); *H04W 4/00* (2013.01); *H04W 84/042* (2013.01)

(56) References Cited

U.S. PATENT DOCUMENTS

| | | | | |
|---|---|---|---|---|
| 7,607,021 | B2* | 10/2009 | Rayes et al. | 713/188 |
| 7,823,199 | B1* | 10/2010 | Rathi et al. | 726/22 |
| 7,854,001 | B1* | 12/2010 | Chen et al. | 726/22 |
| 8,056,132 | B1* | 11/2011 | Chang et al. | 726/23 |
| 8,695,095 | B2* | 4/2014 | Baliga et al. | 726/24 |
| 2006/0294588 | A1* | 12/2006 | Lahann et al. | 726/23 |
| 2007/0097976 | A1* | 5/2007 | Wood et al. | 370/392 |
| 2008/0016208 | A1* | 1/2008 | Treinen | 709/224 |
| 2010/0054221 | A1* | 3/2010 | Tang | 370/338 |
| 2011/0145920 | A1* | 6/2011 | Mahaffey et al. | 726/22 |
| 2012/0151033 | A1* | 6/2012 | Baliga et al. | 709/224 |

OTHER PUBLICATIONS

Amer, S., Hamilton, J. 2010. Intrusion Detection Systems (IDS) Taxonomy—A Short Review, Defense Cyber Security, 13 (2).
Burguera, I., Zurutuza, U. and Nadjm-Tehrani, S. 2011. Crowdroid: Behavior-Based Malware Detection System for Android. In Proceedings of the 1st Workshop on Security and Privacy in Smartphones and Mobile Devices, CCCSSPSM'11.
Chandola, V., Banerjee, A. and Kumar, V. 2009. Anomaly detection: A survey. ACM Comput. Surv. 41(3):1-58.
Cheng, J., Wong, S.H., Yang, H., Lu, S. 2007. SmartSiren: virus detection and alert for smartphones. In Proceedings of the Fifth International Conference on Mobile Systems, Applications and Services.
Eagle, N. and Pentland, A. S. 2006. Reality mining: Sensing complex social systems. Personal and Ubiquitous Computing, 10 (4):255-268.
Enck, W, Gilbert, P., Chun, B.G., Cox, L.P., Jung, J., McDaniel, P. and Sheth, A.N. 2010. Taintdroid: an information-flow tracking system for realtime privacy monitoring on smartphones. In Proceedings of the 9th USENIX conference on Operating systems design and implementation (Berkeley, CA, USA, 2010). USENIX Association, 1-6.
Felt, A.P, Finifter, M. , Chin, E., Hanna, S. and Wagner, D. 2011. A Survey of Mobile Malware in the Wild. In Proceedings of the 1st Workshop on Security and Privacy in Smartphones and Mobile Devices, CCS-SPSM'11.

Garcia-Teodoro, P., Diaz-Verdejo, J., Macia-Fernandez, G., & Vazquez, E. 2009. Anomaly-based network intrusion detection: Techniques, systems and challenges. Comput. Secur. 28(1-2), 18-28.
Huang, Y.-A., Fan, W., Lee, W. and Yu, P. S. 2003. Cross-feature analysis for detecting ad-hoc routing anomalies. In Proceedings of the 23rd International Conference on Distributed Computing Systems (Washington, DC, USA, 2003). ICDCS'03, IEEE Computer Society.
Li, F. Clarke, N.L., Papadaki, M. and Dowland, P.S. 2010. Behaviour Profiling on Mobile Devices, International Conference on Emerging Security Technologies, (Canterbury, UK). 77-82.
McAfee: Android/DroidKungFu.B http://home.mcafee.com/virusinfo/virusprofile.aspx?key=522721.
Moreau, Y., Verrelst, H., Vandewalle, J. 1997. Detection of mobile phone fraud using supervised neural networks: a first prototype. In: Proceedings of the Seventh International Conference on Artificial Neural Networks.
Noto K, Brodley C, Slonim D. 2010. Anomaly detection using an ensemble of feature models. In: Proceedings of the 10th IEEE international conference on data mining.
Portokalidis, G., Homburg, P., Anagnostakis, K. and Bos, H. 2010. Paranoid android: versatile protection for smartphones. In Proceedings of the 26th Annual Computer Security Applications Conference, (New York, NY, USA, 2010). ACM, 347-356.
Schmidt, A.D., Schmidt, H.G., Clausen, J., Yüksel, K. A., Kiraz, O., Camtepe, A. and Albayrak, S. 2008. Enhancing security of linux-based android devices. In Proceedings of 15th International Linux Kongress.
Schmidt, A.D., Peters, F., Lamour, F., Scheel, C., Camtepe, S.A., Albayrak, S. 2009. Monitoring smartphones for anomaly detection. Mobile Netw. Appl. 14 (1), 92-106.
Shabtai, A., Kanonov, U. and Elovici, Y. 2010. Intrusion detection for mobile devices using the knowledge-based, temporal abstraction method. J. Syst. Softw. 83:1524-1537.
Shabtai, A., Kanonov, U., Elovici, Y., Glezer, C. and Weiss, Y. 2011. Andromaly: a behavioral malware detection framework for android devices. J. Intell. Inf. Syst. 1-30, 10.1007/s10844-010-0148-x.
Shamili, A.S., Bauckhage, C. and Alpcan, T. 2010. Malware detection on mobile devices using distributed machine learning. In Proceedings of the 20th International Conference on Pattern Recognition (Washington, DC, USA, 2010). ICPR'10, IEEE Computer Society, 4348-4351.
Symantec: Android.Pjapps http://www.symantec.com/security_response/writeup.jsp?docid=2011-022303-3344-99&tabid=2.
Symantec: Android.Geinimi http://www.symantec.com/security_response/writeup.jsp?docid=2011-010111-5403-99&tabid=2.
Qian, F., Wang, Z., Gerber, A., Mao, Z., Sen, S. and Spatscheck, O. 2011. Profiling resource usage for mobile applications: a cross-layer approach, In Proceedings of the 9th International Conference on Mobile Systems, Applications, and Services (Bethesda, Maryland, USA).
Weka 3: Data Mining Software in Java http://www.cs.waikato.ac.nz/ml/weka/ (prior to Oct. 2012).

* cited by examiner

SYSTEM FOR DETECTION OF MOBILE APPLICATIONS NETWORK BEHAVIOR-NETWISE

FIELD OF THE INVENTION

The present invention relates to the field of detection of deviations in mobile application's network behavior. More particularly, the present invention relates to detection of malware activity in mobile networks.

BACKGROUND OF THE INVENTION

Publications and other reference materials referred to herein, including reference cited therein, are incorporated herein by reference in their entirety and are numerically referenced in the following text and respectively grouped in the appended Bibliography which immediately precedes the claims.

Along with the significant growth in the popularity of smartphones and in the number of available mobile applications, the number of malware applications which harm users or compromise their private data is significantly increased. Furthermore, the significant growth of social networking and always-connected applications has caused a dramatically increasing influence on traffic and signaling loads on the mobile networks, potentially leading to network congestion incidents. Network overloads can be caused by either intended attacks or by benign, but unintentionally faultily designed, and thus "network unfriendly" applications. Both the malware activities and the "network unfriendly" applications regularly affect the network behavior patterns and can be detected by monitoring an application's network behavior. Thus, monitoring and analysis of network-active applications' traffic patterns is essential for developing effective solutions for the prevention of network overloads.

Traditionally Intrusion Detection Systems (IDS) are classified according to the protected system type as being either host-based (HIDS) or network-based (NIDS) [1]. A network-based IDS is located on a central or distributed dedicated server and monitors any number of hosts. Its performance is based on analysis of network related events, such as traffic volume, IP addresses, service ports, protocol usage, etc'. Traffic monitoring is usually accomplished at concentrating network units, such as switches, routers, and gateways. On the other hand, a host-based IDS resides on and monitors a single host machine. Its performance is based mainly on an analysis of events related to OS information, such as file system, process identifiers, system calls, etc' as disclosed in [8].

Many malware applications use network communication for their needs, such as sending a malicious payload or a command to a compromised device, or getting user's data from the device. Such types of behavior influence the regular network traffic patterns of the application and can be identified by learning the application's "normal" patterns and further monitoring network events.

Recently, with the dramatic increase in the number of malware applications targeting smartphones, various methods for intrusion detection on mobile devices have been proposed. Most of the IDSs for mobile devices have focused on host-based intrusion detection systems applying either anomaly or rule-based methods on the set of features that indicate the state of the device [17]. However, in most cases, the data interpretation processes are performed on remote servers motivated by limited computational resources of the mobile phone. Only a few of the proposed systems perform the learning or data analysis directly on the device [6, 10, 19] and even less have applied statistical or machine-learning techniques [10, 19], even though such techniques are very popular and have been successfully used in traditional anomaly detection systems [8, 19]. Most of the systems either send the observed data to the server for analysis [2, 4, 12, 14, 16, 22] or perform the learning process offline on the server and plant the learned models back to the devices for the detection process [15, 17, 18].

In a few earlier proposed systems the learning is performed on the mobile devices. For example, the system proposed by Shamili et al. [19] utilizes a distributed Support Vector Machine algorithm for malware detection on a network of mobile devices. The phone calls, SMSs, and data communication related features are used for detection. During the training phase support vectors (SV) are learned locally on each device and then sent to the server where SVs from all the client devices are aggregated. Lastly, the server distributes the whole set of SVs to all the clients and each of the clients updates his own SVs. Thus, although a part of the learning is performed on the device, the server and communication infrastructure, along with additional bandwidth load, are required.

Li et al. [10] presented an approach for behavior-based multi-level profiling IDS considering telephony calls, device usage, and Bluetooth scans. They proposed a host-based system which collects and monitors user behavior features on a mobile device. A Radial Basis Network technique was used for learning profiles and detecting intrusions. However, the system capabilities were, also, tested offline only using the MIT Reality dataset [5] and its feasibility on mobile devices was not tested or verified.

It is therefore a purpose of the present invention to provide a system for protecting mobile device users from harmful applications.

It is a further purpose of the present invention to provide a system for protecting cellular network infrastructure from targeted or benign overloads.

Further purposes and advantages of this invention will appear as the description proceeds.

SUMMARY OF THE INVENTION

In a first aspect the invention is a system for protecting mobile devices in cellular networks from unauthorized harmful applications and for protecting cellular network infrastructure from targeted or benign overloads comprising mobile cellular devices and a cellular network infrastructure, wherein some of the mobile devices comprise an application manager which is adapted to manage the aggregation and learning processes and a detection manager which is adapted to analyze network behavior and detect deviations, wherein the application manager and detection manager are adapted to monitor the applications running on a device, learn the patterns of mobile applications network behavior and detect meaningful deviations from the application's observed normal behavior, and where the cellular network infrastructure comprising a services module, a logic module and a database access unit adapted for aggregation and analysis of an application's network traffic patterns for numerous users.

In embodiments of the invention, the application manager comprises:
a Registration Unit, adapted to extract the list of all installed applications and device identifiers; a Features Extraction Manager, adapted to manage the extraction, aggregation and learning processes according to the defined time intervals, and report to the server the application's data according to the received schedule; a Models Manager, adapted to perform all the models related operations; a Configuration Manager, adapted to perform all the configuration related operations (i.e. load, get, update); a Logging unit, adapted to record the specified events in the log files; an Alerts Handler, adapted to present the alerts to user interface and report to the server; and a Communication Services unit, adapted to perform all the communication related operations with external systems (i.e. server).

In embodiments of the invention, the application manager comprises:
a Registration Unit, adapted to extract the list of all installed applications and device identifiers; a Features Extraction Manager, adapted to manage the extraction, aggregation and learning processes according to the defined time intervals, and report to the server the application's data according to the received schedule; a Models Manager, adapted to perform all the models related operations; a Configuration Manager, adapted to perform all the configuration related operations (i.e. load, get, update); a Logging unit, adapted to record the specified events in the log files; an Alerts Handler, adapted to present the alerts to user interface and report to the server; and a Communication Services unit, adapted to perform all the communication related operations with external systems (i.e. server).

In embodiments of the invention, the infrastructure comprises:
 a) a services module, to manage features data from the devices;
 b) a logic module, to manage the models for multiple users; and
 c) a database-access (DBA) unit, to provide the basic functionality for data insertion, deletion, and update.

In embodiments of the invention, the services module comprises: a User's Registration unit, adapted to register the application on the new devices, and update the lists of installed applications according to the information received from the devices; a Features Distribution Manager, adapted to extract the features distribution process, and update the defined schedule; a Features Acquisition unit, adapted to acquire and store the features data from the devices; a Models Distributor, adapted to transfer collaborative models to the devices; and an Alerts Handler, adapted to send alerts to the devices, store it locally, and send relevant alerts to the system administrator.

In embodiments of the invention, the logic module comprises:
a Models Learner unit, adapted to induce the collaborative models representing applications traffic patterns for multiple users; a Models Manager, adapted to perform all the models related operations, and store and retrieve the models from the storage; and a Models-Change Detector, adapted to verify if a collaborative model has significant changes so that it needs to be updated on the devices.

In embodiments of the invention, the models related operations may comprise the following:
 a) matching of unknown patterns to existing models;
 b) decides when to start the collaborative learning process; and
 c) store and retrieve the models from the storage.

In a second aspect the invention is a method for protecting mobile devices in a cellular network from unauthorized harmful applications and for protecting cellular network infrastructure from targeted or benign overloads, wherein the mobile devices comprising an application manager and a detection manager adapted to learn the patterns of mobile applications network behavior and detect meaningful deviations from the application's normal behavior, and the cellular network infrastructure comprising a services module, a logic module and a database access unit adapted for aggregation and analysis of an application's network traffic patterns for numerous users, comprising the following steps:
 a) measuring applications network behavior on the mobile device with a Features Extraction unit, comprising components adapted to perform the measurement of the defined features at the specified time periods;
   a Features Aggregation unit, comprising components adapted to compute the defined aggregations over all the extracted measurements for the specified time period;
 b) aggregating the extracted features for the specified time interval with a Features Aggregation unit, comprising components adapted to compute the defined aggregations over all the extracted measurements for the specified time period;
 c) learning and storing the local model of the device with a Local Learner unit, comprising components adapted to induce the local models representing an application's traffic patterns specific for the user;
 d) reporting the aggregated features along with the learned local models to the sever according to the server's requests with a Features Extraction Manager, adapted to manage the extraction, aggregation and learning processes according to the defined time intervals;
 e) storing the instances of aggregated features and the local models in the database with a Features Acquisition unit, adapted to acquire and store the features data from the devices; and
 f) receiving a test instance form features aggregation module and reading the local model from models data storage in order to detect anomalies with an Anomaly Detector unit, comprising components adapted to perform online analysis of an application's network behavior and to detect deviation from its normal patterns.

In embodiments of the invention, if there is no "Anomaly" detected the process continues as usual.

In embodiments of the invention, if an "Anomaly" has been detected, a Models Manager unit (on the device) executes the relevant models related operations; initiates connection to the server in order to receive a collaborative model of the application in question.

In embodiments of the invention, the models related operations may comprise the following:
 a) deciding if there is enough data to start the learning process;
 b) getting the collaborative models from the server; and
 c) storing them on the local storage.

In embodiments of the invention, the method further comprises:
 a) supplying the required collaborative model to the device with a Models Distributor, adapted to transfer collaborative models to the devices;
 b) continuing as usually if there is no "Anomaly" detected vs. the collaborative model; and
 c) sending an "Anomaly Alert" to a Graphical User Interface (GUI) on the device and to the server if an "Anomaly" vs. the collaborative model has been detected, with an Alerts Handler, adapted to send an alert to the device, store it locally, and send relevant alerts to the system administrators and other relevant users.

The invention provides a system invented for learning the patterns of mobile applications network behavior and detection of meaningful deviations from the application's normal network behavior. The main goal of this system is to protect mobile device users and cellular infrastructure from unauthorized malicious applications. The system is designed to (a) identify malicious attack or masquerading for an application which is already installed on a mobile device and (b) identify republishing of popular applications with injected malicious code. The detection is performed based on the application's network behavior patterns solely. For each application two types of models are learned. The first one represents the personal network usage pattern for a user. It is learned and resides on the user's device. The second one represents a common network usage pattern of numerous users. This model is learned and resides on the system server.

The performed data analysis reveals that applications have very specific network traffic patterns, and that certain application categories can be distinguishable from their traffic patterns. The system evaluation experiments were conducted with a wide range of different applications, their versions, and several self-developed and real malware applications. The results demonstrate that different levels of deviations from normal behavior can be detected accurately. Specifically, the deviation in up to 20-25 percent of observations might be due to variations in a user's behavior or an application's diverse functionality; deviations in various ranges from 0 up to almost 90 percent of instances might be observed due to an application's version update; lastly, the deviations in 60 and more percent of observations are regularly caused by injected malware. In addition, the conducted experiment described herein below proves the feasibility of the proposed implementation and analyses performance overhead on mobile devices.

The invention has therefore the following advantages:
Performs local and collaborative analysis of applications behavior.
Provides an aggregated picture on applications' behavior of various users.
Allows extensive data analysis.
Designed so that network traffic and load on devices is minimized.

All the above and other characteristics and advantages of the invention will be further understood through the following illustrative and non-limitative description of embodiments thereof, with reference to the appended drawings.

DETAILED DESCRIPTION OF EMBODIMENTS OF THE INVENTION

The invention serves two purposes. First, it allows protection of mobile device users from malware applications and second, allows for aggregation and analysis of an applications' network traffic patterns (to be used for development of solutions protecting cellular infrastructure from malicious and "network unfriendly" benign applications). Regarding the protection of users from malware applications, the system supports two main use cases. The first case relates to applications already installed on a device and the second, to newly downloaded and installed applications. In the first case, the network traffic pattern of an application can be changed due to: (a) the changes in the user's behavior or (b) an application update to a new benign version or (c) a malicious attack. In this case the system's purpose is to detect the deviation in the application's traffic pattern and correctly classify it to one of the three above mentioned reasons. In the second case, the system's purpose is to identify whether the new application is actually a modification of another application with some new (probably malicious) behavior.

For the above purposes the system follows the hybrid Intrusion Detection Systems (IDS) approach and is designed in the client-server architecture (the system may also work as a stand-alone client application, without the server side). The responsibility of the client-side software is to monitor the applications running on a device, learn their user-specific local models and detect any deviations from the observed "normal" behavior. The responsibility of the server-side software is the aggregation of data reported from mobile devices and the learning of collaborative models, which represent the common traffic patterns of numerous users for each application. The local models are used for detection of deviations in traffic patterns of installed applications; the collaborative models are used for verification of newly installed applications vs. the known traffic patterns.

A new application downloaded and installed on a device can be either a republished version of a popular application or an original application claiming to provide some new type of service. In both cases the new application can be benign or malicious. The malicious or cracked versions of the popular applications can be detected by comparison of their network patterns to those of the known applications. In the malicious version of a popular application the patterns are similar to those of the original application but with some level of deviation are expected to be detected.

Figure 1:
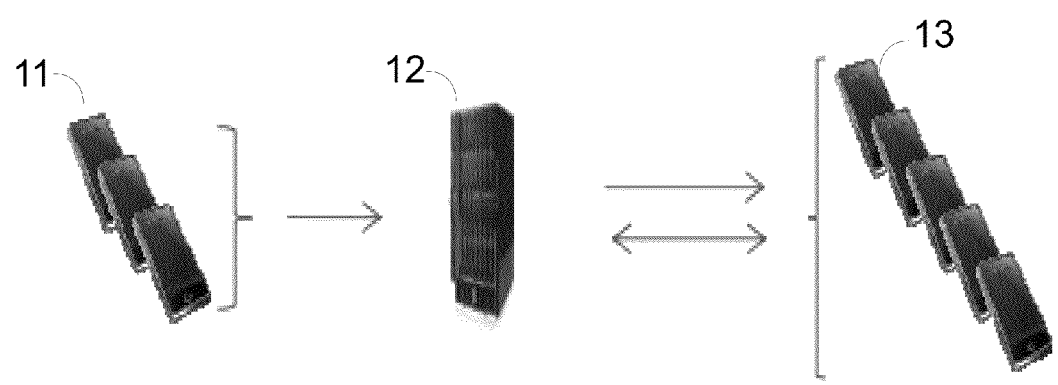
FIG. 1 schematically illustrates the general structure of the system of the invention.

FIG. 1 schematically illustrates the general structure of the system, where personal (i.e., local) learning of models on a device is initiated with several users (11) and distributed aggregation of network behavior features from the numerous mobile devices (11) is carried out on the server (12). At the server (12), common (i.e. collaborative) learning of models occurs and then the relevant collaborative models are deployed back to the devices when required for a larger number of users (13), where detection of behavioral changes on the devices occurs. On the server (12), detections of meaningful deviations from the common behavior are carried out. And finally, alerting the users (13) and the server (12) about detected anomalies.

The main processes of the system operate in the following way:
Initial User Registration
  Once the traffic detection application (named Netwise) is installed on a user's device, it retrieves a list of all currently installed applications and sends it along with the device identifier to the server (the application may come "build in" with the phone already upon purchase by the user (i.e. the mobile operator can install the application in advance on all the phones) or alternatively installed by the user whenever he/she chooses).
  The server responds by sending the collaborative models accordingly to the list of the installed applications. Additionally it sends to each device a schedule defining the period and applications for which the extracted features (described herein below) need to be reported to the server.
Management of Features Extraction Distribution
  The server manages the data from the devices running the Netwise application and the lists of the applications installed on these devices. Assuming a large number of users running the traffic detection application there is no need to aggregate information from all the users about all their applications. Instead the aggregation can be distributed in such a way that each of the devices will periodically send the information about some of the applications. Obviously the server should consider the possibilities that devices may not run all of the specified applications at the specified time period. Moreover, it could happen that some of the devices are unable to deliver the aggregated data to the server when relevant. Thus, the server should take these scenarios into account when preparing the schedule by requesting more data than it actually needs for learning. The server recalculates and updates the schedules of the indicated device accordingly to the changes in applications distribution.

Local Learning

The measurement of the defined features is performed for each running application at the defined time intervals (such as each 5 or each 10 or 30, etc., seconds). A longer time interval (such as 1 or 2 or 5 minutes) is defined for aggregation of the extracted features to data vectors which are used for the learning. During the aggregation various statistics (such as average, total, minimal and maximal values among the observed data, etc.) are computed on the row measurements. The learning is performed when enough data has been aggregated. The machine learning algorithms are utilized for inducing models representing applications traffic patterns. Both the aggregated data and the learned models are stored on the device local storage. The old aggregated data will be removed once it becomes unnecessary, and the learned models will be replaced with new ones when required.

Features Reporting

The features are measured and monitored constantly or according to the configurable time slots on all the devices. However, only the locally learned models (or optionally the aggregated data) are reported to the server according to the schedule received by each of the devices.

Collaborative Learning

The data reported from various devices is aggregated on the server and is used for learning the collaborative models. The collaborative models can be either induced from the aggregated data vectors (similarly to the local learning) or combined from the local models following ensemble (i.e., the classifier committees) approach.

Anomaly Detection

The detection process is performed constantly or according to the configurable time slots which can be defined by user. For detection, the defined features are measured and aggregated as in the Local learning process. The vectors of the aggregated features are validated versus the related local model. In case a significant deviation from the expected pattern is detected a request for the relevant collaborative model is sent to the server. The questionable aggregated vectors are then validated versus the related collaborative model. In case a significant deviation from the collaborative model is detected security alerts are send both to the user interface on the device and to the server, and alerts about a suspected application can be distributed from the server to other relevant users. A user can choose to receive the alerts for the locally detected deviations as well.

New (Known) Application Handling

When a user installs a new application on his device which is already known in the Netwise system, the device simply requests the existing collaborative model from the server. This model is used for the local detection until enough data for the new application is aggregated and a local model is learned.

Unknown Application Handling

When a user installs a new application which is unknown to the Netwise system, the local learning on the device is started. After the first local model is learned it is sent to the server which tries to find a match with one of the known applications' models. If the match is found then an alert about masquerading\republished application is sent to the relevant user and system administrator. Otherwise, the new application is considered as legitimate till known patterns of malicious or "network unfriendly" applications are identified.

Figure 2A:
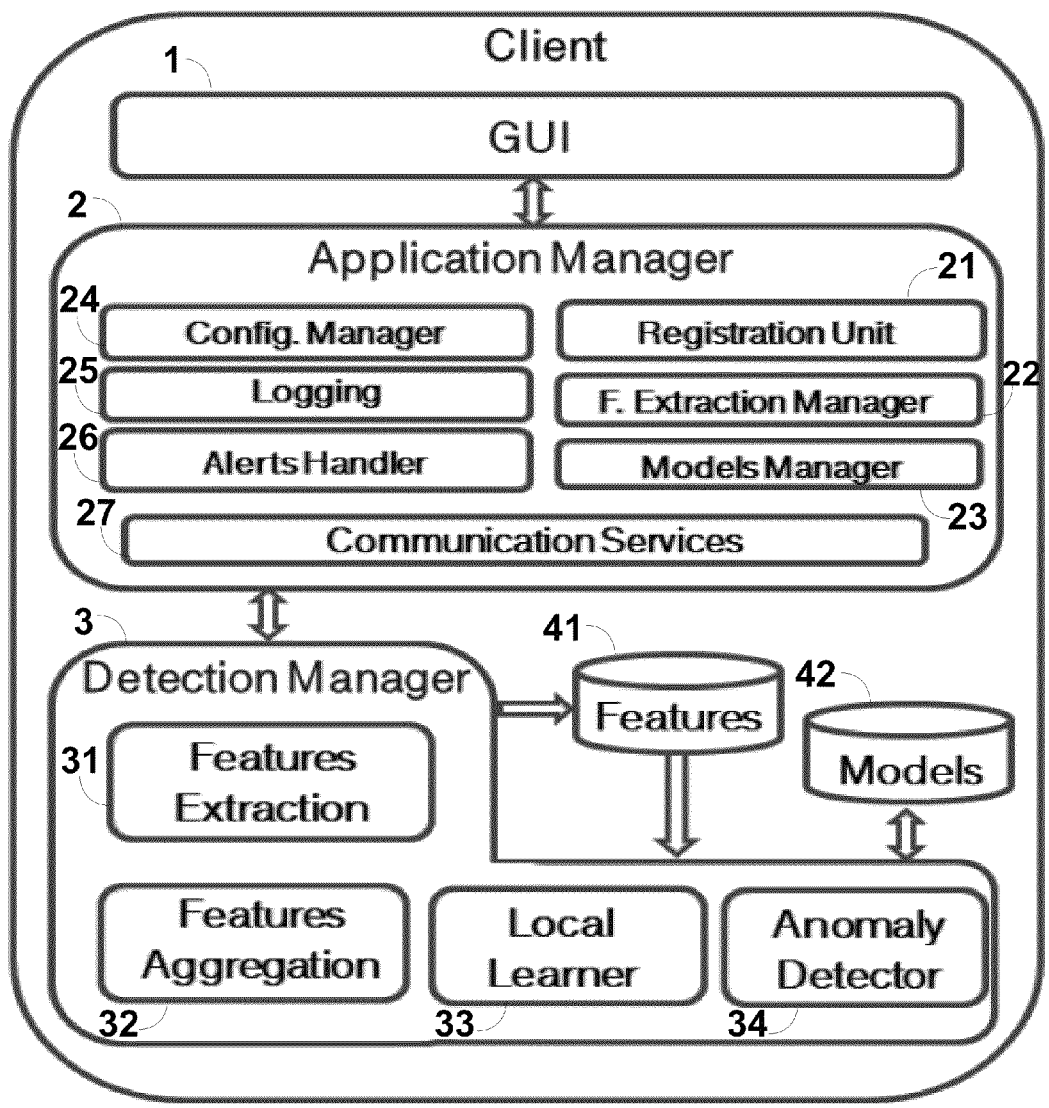
FIGS. 2A-2C schematically illustrate the detailed system architecture.
Figure 2B:
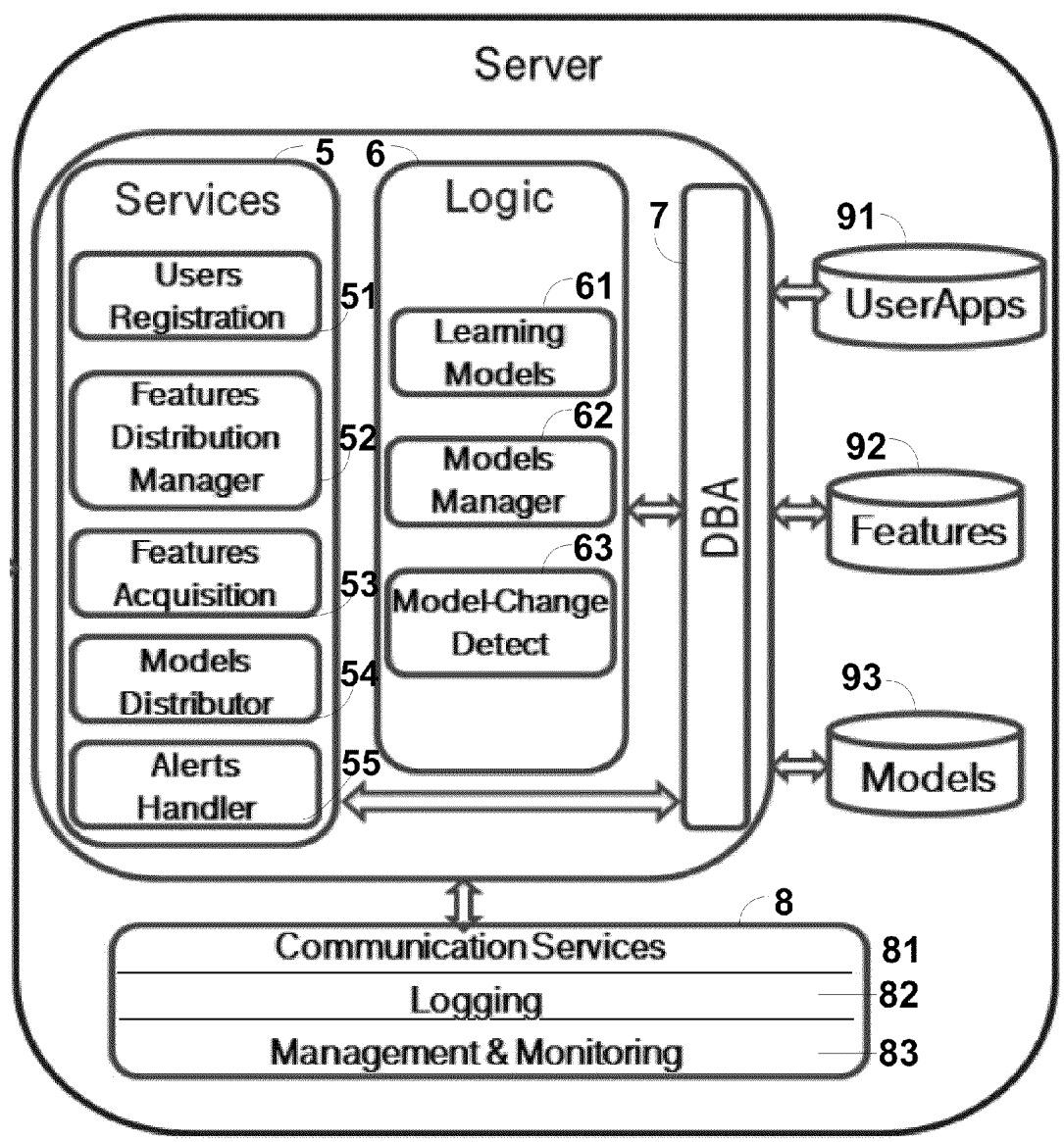

FIGS. 2A and 2B schematically illustrate the detailed system architecture, consisting of the server and client-side modules. Each of the blocks contains the relevant components while the double-headed arrows illustrate the data flow between the system components.

FIG. 2A shows the client-side block diagram. Module '1' describes the Graphical User Interface (GUI), which is responsible for communication with the user (presenting the relevant information, receiving the desirable parameters configuration, starting and stopping the monitoring, etc').

Module '2' describes the application manager, comprising a Registration unit (21), responsible for the extraction of the list of all installed applications and device identifier; a Features Extraction Manager (22), responsible for managing the extraction, aggregation and learning processes according to the defined time intervals, and for reporting to the server the application's data according to the received schedule; an Alerts Handler (26), responsible for presenting the alerts to user interface and reporting to the server; a Models Manager (23), performing all the models related operations, such as deciding if there is enough data to start the learning process, getting the collaborative models from the server, storing them on the local storage, etc'; a Configuration Manager (24), responsible for loading and receiving (either from user or server) configuration parameters and updating the corresponding modules; a Logging (25), responsible for recording and logging the most important events in the log files; and a Communication Services (27), responsible for establishment and managing required communications with the server.

Module '3' describes the detection manager, comprising a Features Extraction unit (31), that performs the measurements of the defined features at the defined time periods; a Features Aggregation unit (32), that is responsible for computing the specified aggregations over all the extracted measurements at the defined time periods. The instances of the aggregated data are used to induce machine-learning models representing an application's behavior and for further anomalies detection; a Local Learner unit (33), responsible for inducing the local models representing applications traffic patterns specific for the user; and an Anomaly Detector (34), responsible for online analysis of applications network behavior and detection of deviation from its normal pattern. A Features storage unit (41), responsible for storing the aggregated features of the monitored applications; and a Models storage unit (42), responsible for storing local and collaborative models of the monitored applications.

FIG. 2B shows the server block diagram. Module '5' describes the services unit, comprising an User's Registration unit (51), responsible for the application registration on the new devices: receives the device identifier and the list of the installed applications and passes the list to Models Distributor (54); updates the lists of installed applications according to the information received from the devices; a Features Distribution Manager (52), responsible for the features extraction distribution process: defines the periods and applications to be reported by each one of the devices, verifies the received information, and updates the defined schedule as needed; a Features Acquisition unit (53), responsible for acquiring and storing the features data from the devices; a Models Distributor (54), responsible for transferring collaborative models to devices as needed; and an Alerts Handler (55), responsible for sending alerts to the devices, storing it locally on the server, and sending relevant alerts to the system administrator. Module '6' describes the logic unit, comprising a Models Learner unit (61), responsible for inducing the collaborative models representing applications traffic patterns for multiple users; a Models Manager (62), responsible for performing all the models related operations, such as matching of unknown patterns to existing models, decides when to start the collaborative learning process, store and retrieve the models from the storage, etc'; and a Models-Change Detector (63), responsible for verifying if a collaborative model has significant changes so that it needs to be updated on the devices.

Module '7' describes the Data-Base Access (DBA), a library with data access helpers (providing the basic functionality for data insertion, deletion, and update).

Module '8' describes the Communication Services unit (81) responsible for establishment and managing required communications with clients; Logging unit (82) responsible for recording and logging the most important server events or errors in the log files; and Management & Monitoring unit (83) responsible for providing system's administrators and users data monitoring, analysis and management capabilities. A UserApps storage unit (91), responsible for storing device identifier and the list of the installed applications for all registered users; a Features storage unit (92), responsible for storing the aggregated features of the monitored applications; and a Models storage unit (93), responsible for storing local and collaborative models of the monitored applications.

Figure 2C:
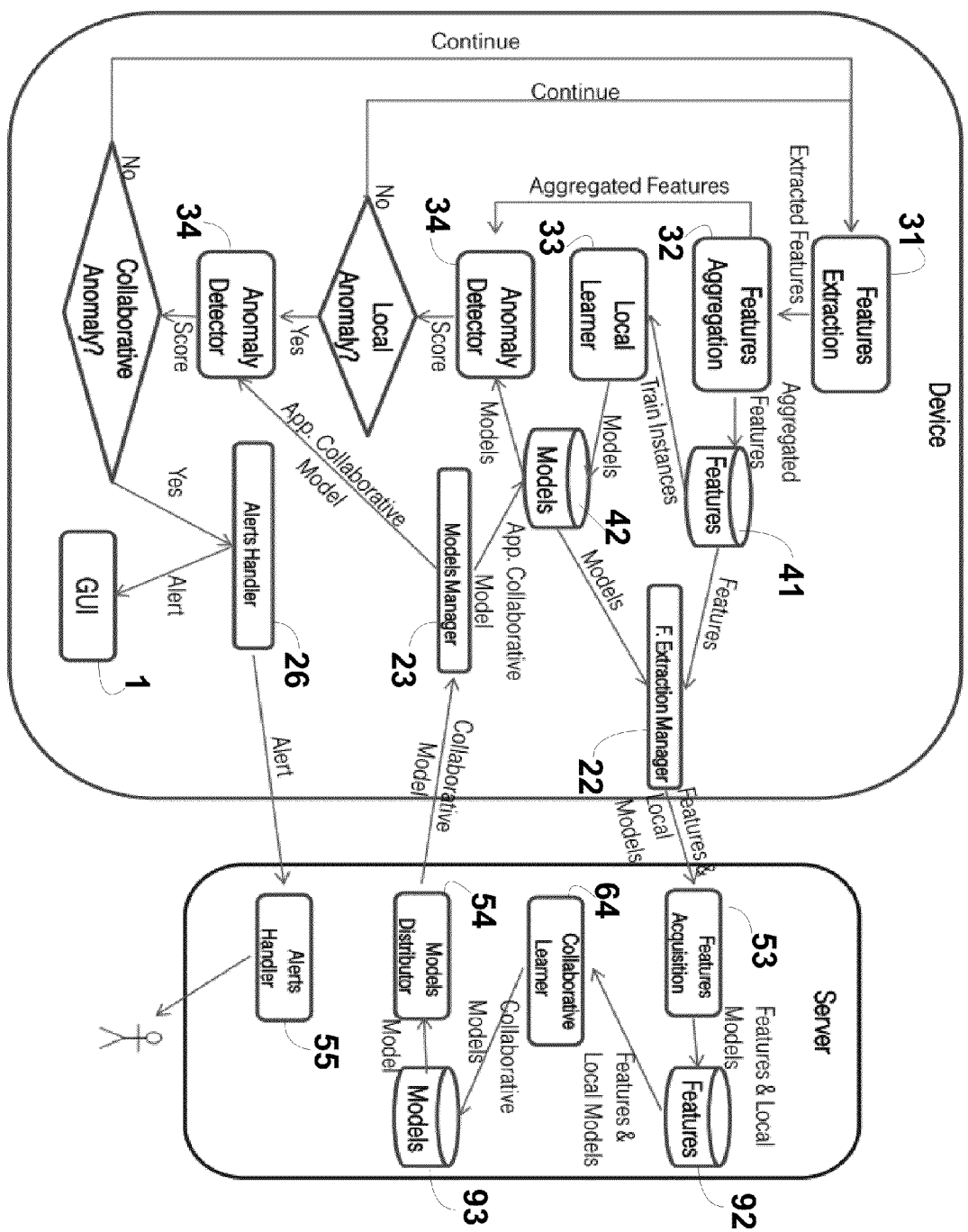
Figure 3B:
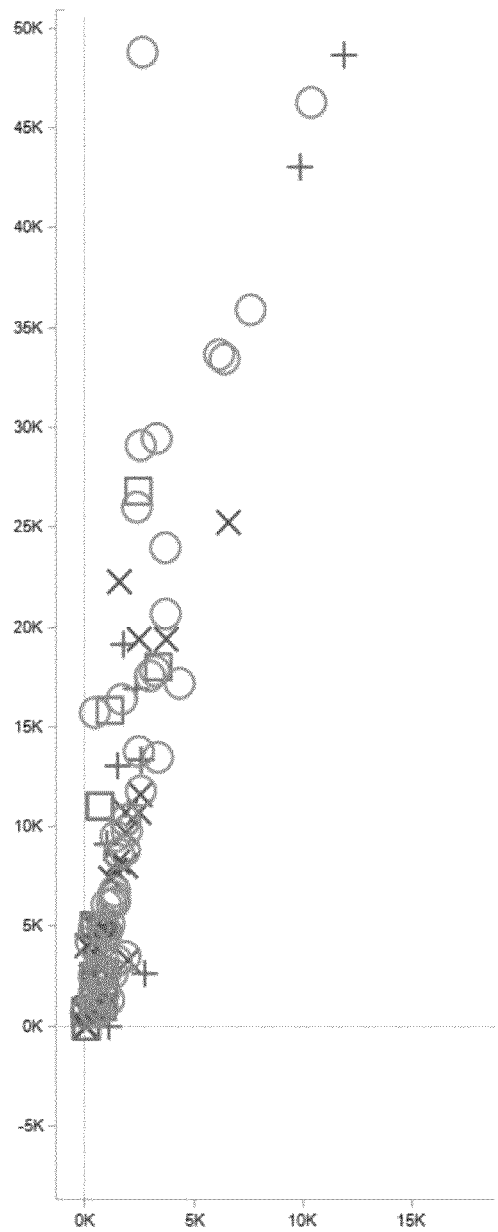
FIGS. 3A-6B show examples of data analysis for several popular applications.
Figure 3A:
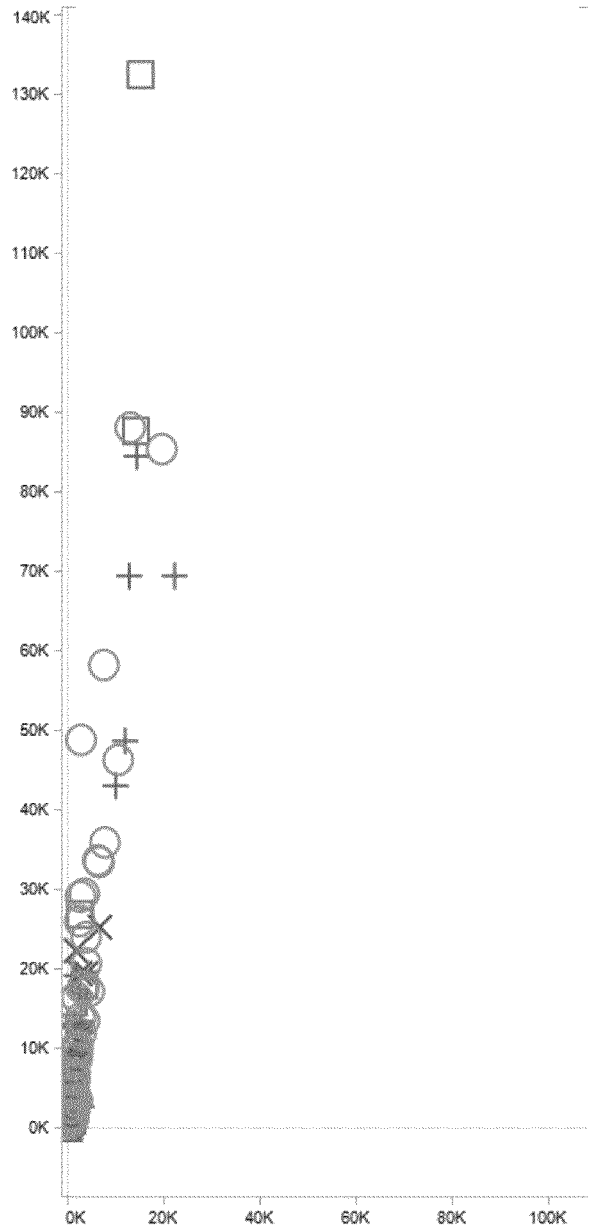
Figure 4A:
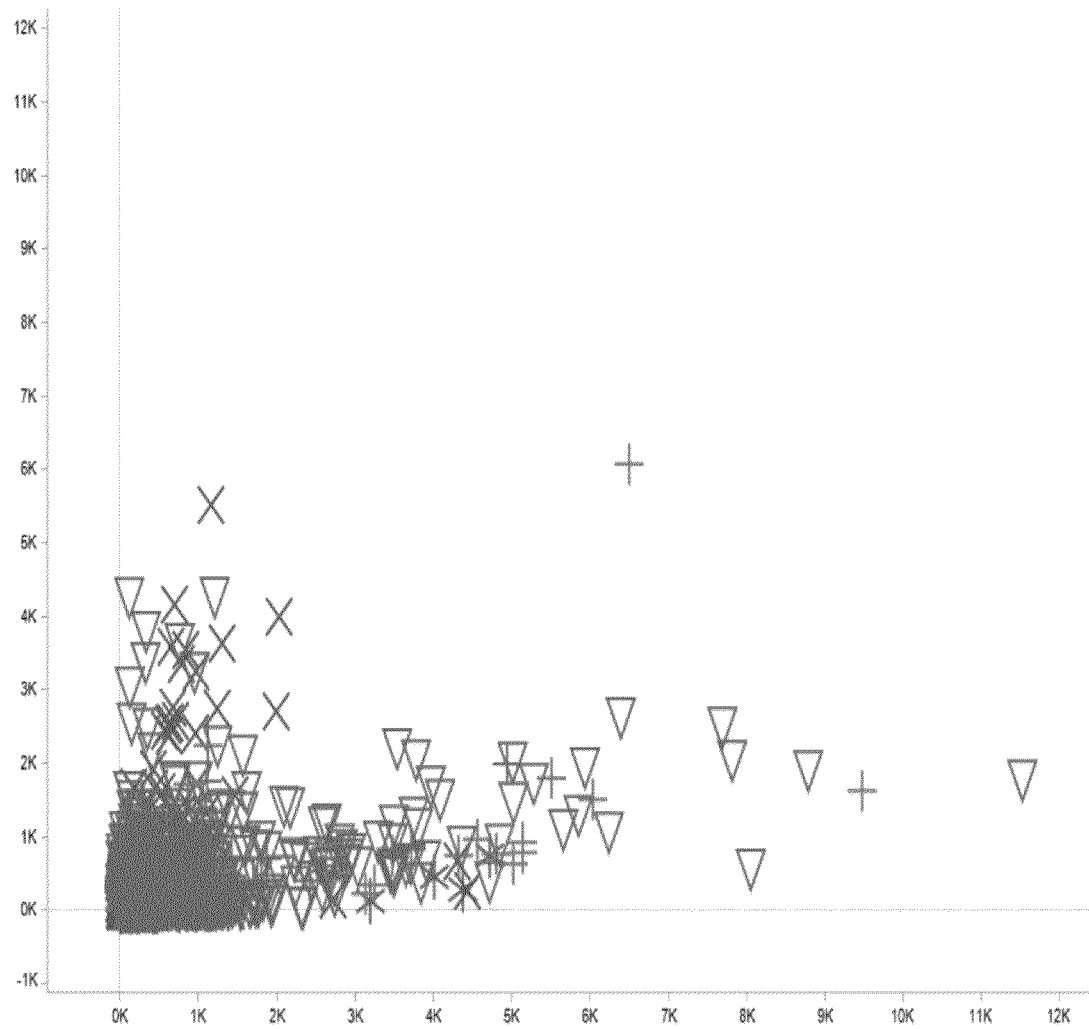
Figure 4B:
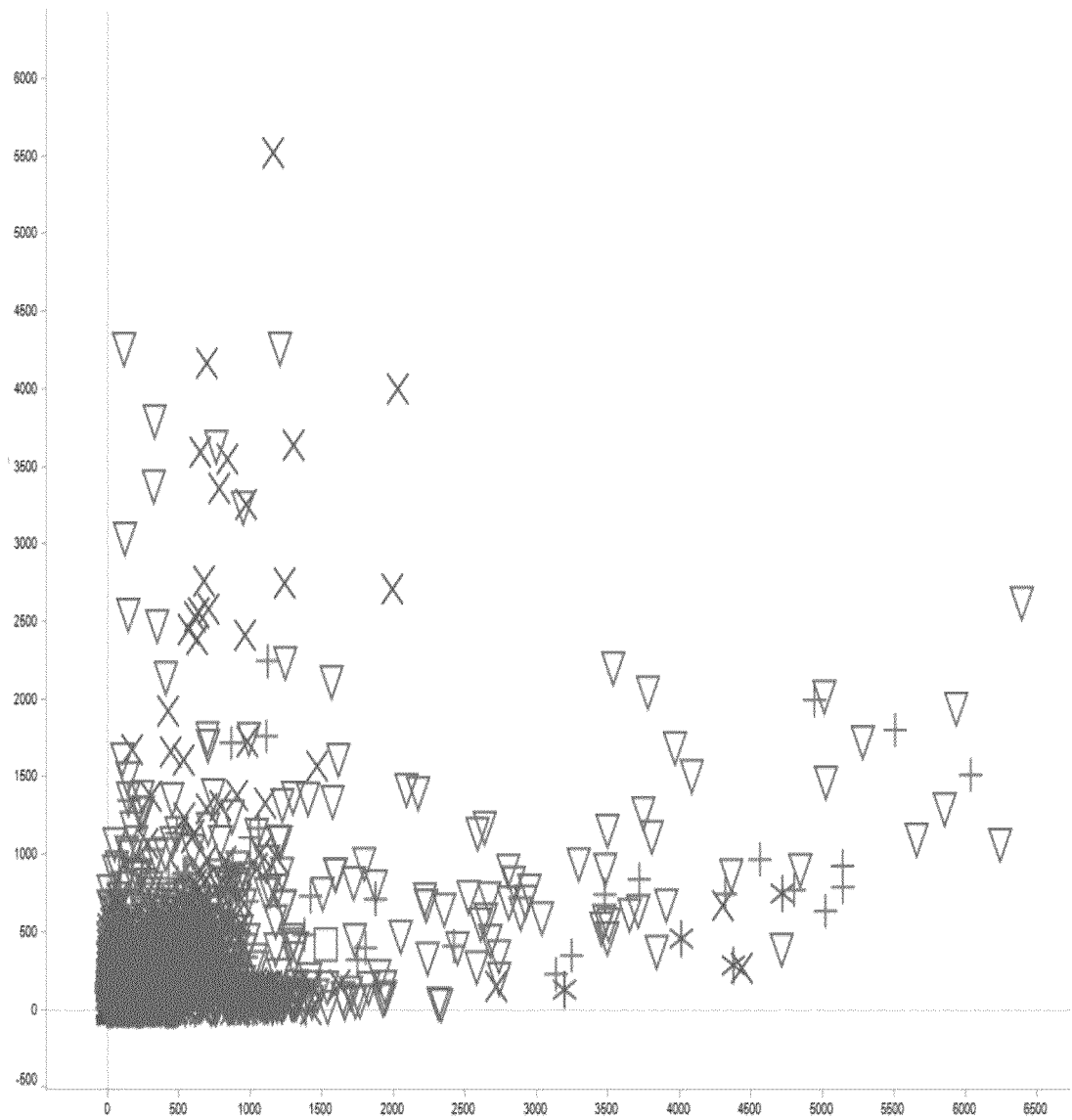
Figure 5A:
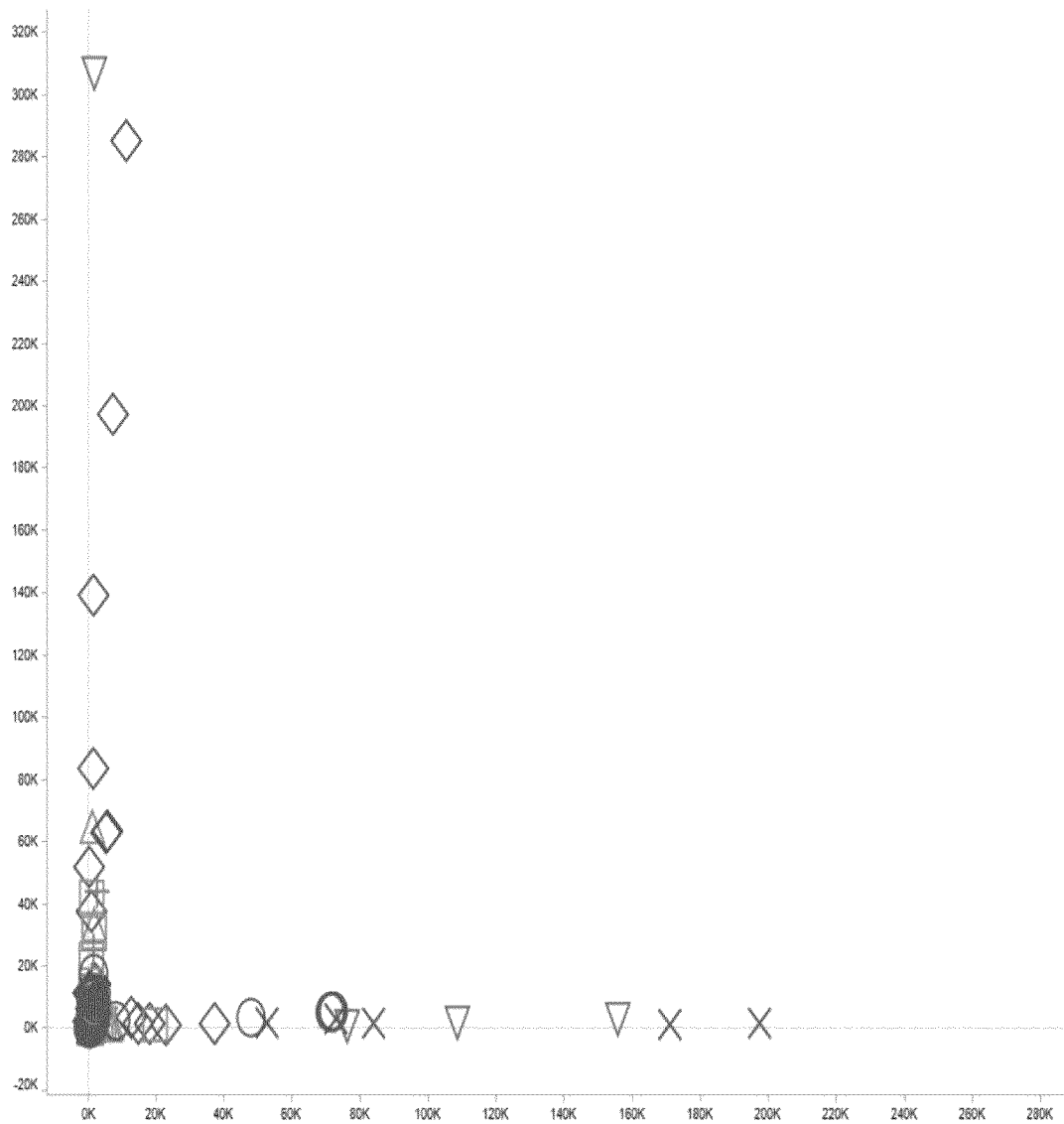
Figure 5B:
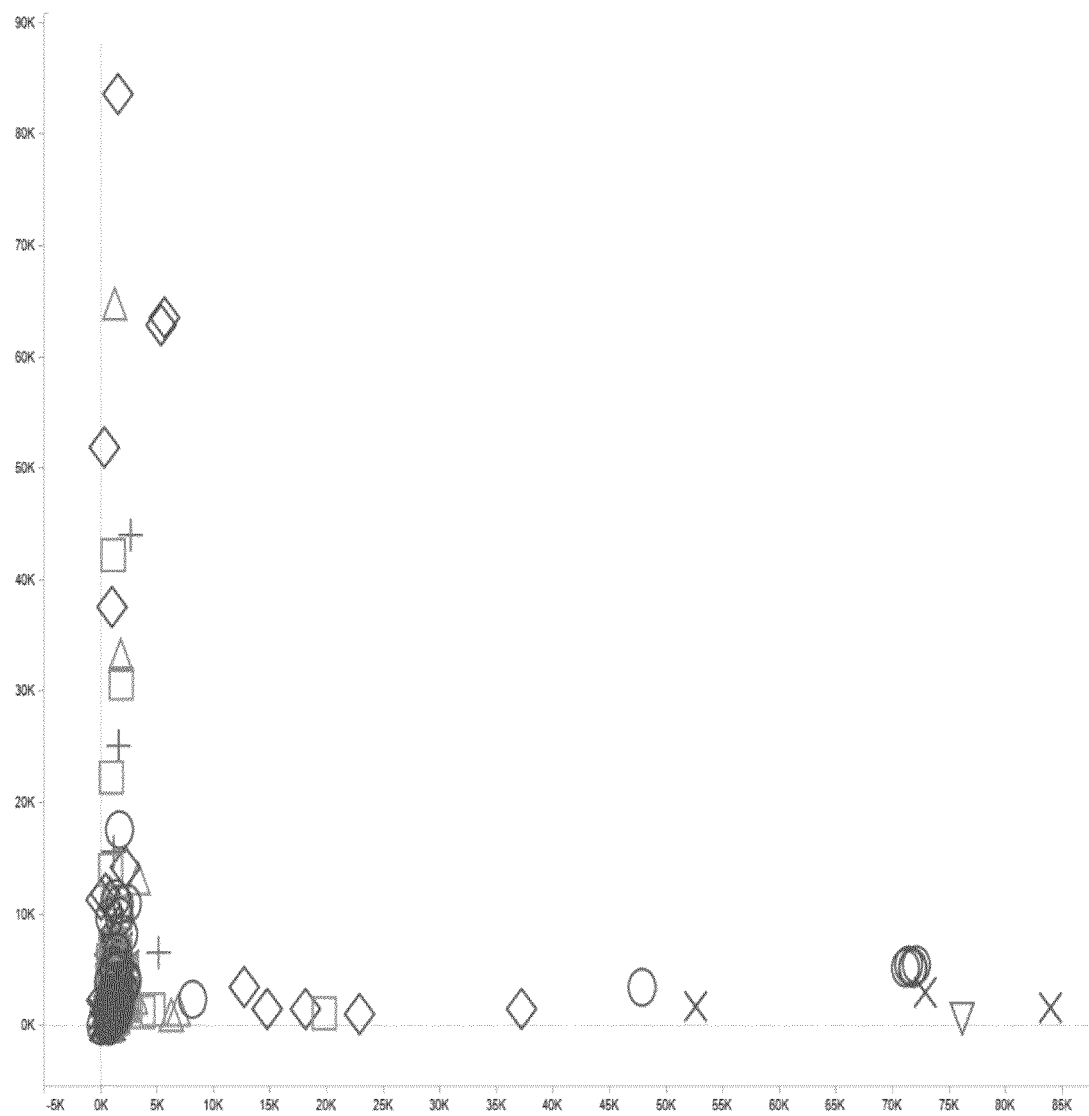
Figure 6B:
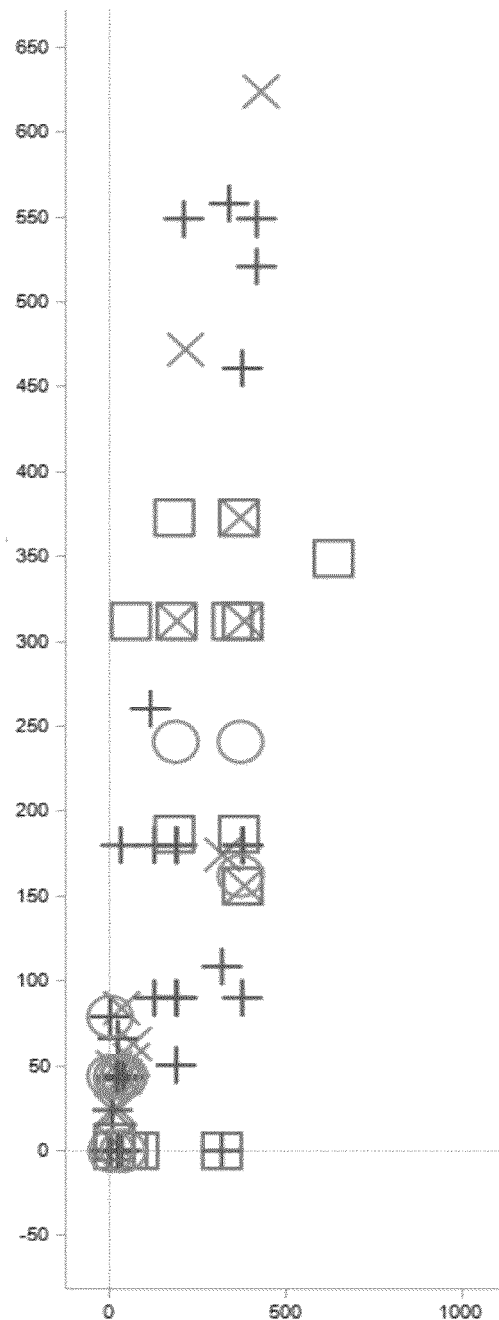
Figure 6A:
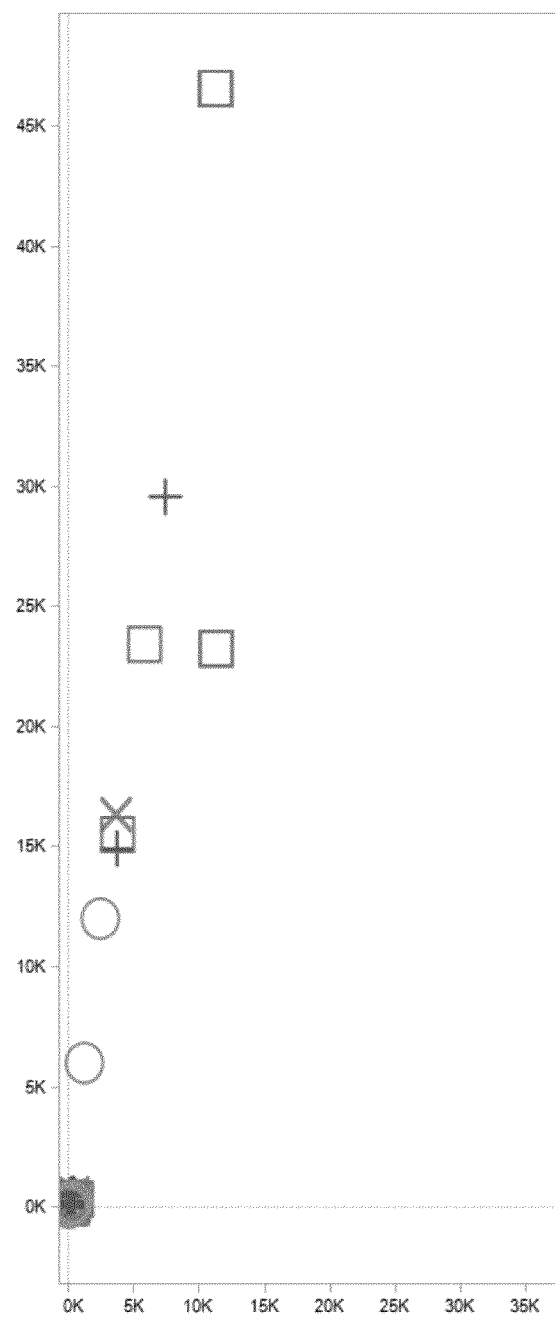

FIG. 2C shows the interaction between the server and the client. The process starts by measuring applications network behavior (i.e. Features Extraction (31)) on the device. The extracted features are aggregated for the specified time interval (32). Once there are enough instances for an application its local model is learned and stored on device (33). The aggregated features along with the learned local models (42) are reported to the server according to the server's requests. On the server side, the instances of aggregated features and the local models are stored in the database (53); The instances of aggregated features and the local models are then used for learning the collaborative models. For all network-active applications having local model the detection process is performed. A test instance is received from features aggregation module (32) and local model is read from models data storage (42). If there is no "Anomaly" detected (34) the process continues as usual. If an "Anomaly" has been detected, the models manager (23) initiates connection to the server in order to receive the collaborative model (64) of the application in question (if this model does not exist on the device already). The collaborative model is stored on the device once received. The models distributor module (54) on the server is responsible for supplying the required collaborative model to the device. If there is no "Anomaly" detected vs. the collaborative model, the process continues as usually. If an "Anomaly" vs. the collaborative model has been detected, an application (i.e. alerts handler module (26)) sends "Anomaly Alert" to Graphical User Interface (1) and to the server. Alerts handler module on the server (55) is responsible for storing "Anomaly Alerts" locally on the server (in the log files for example), and sending relevant alerts to the system administrators and other relevant users.

As mentioned above, the Features Extraction module (31) is responsible for extraction (i.e., measuring and capturing) of the defined list of features for each running application at each defined time period. For this purpose it uses the application-programming-interfaces (APIs) provided by the Android Software Development Kit (SDK). Below is a list of the extracted features in one embodiment of the invention:

sent\received data in bytes and percent;
network state (Cellular, Win or "No network");
time (in seconds) since application's last send\receive data;
send\receive mode (eventual\continuous)—derived from "since-last-send\receive-seconds", i.e., if the last send or receive data event was detected less than a specified number of second ago, the corresponding (send or receive) mode is continuous, otherwise it is eventual;
two application states—the first, specifies whether the application is in foreground or background and the second, specifies whether the application is among the active or non-active tasks at the time of the measurement;
time in fore\background (in seconds and percent)—total time that an application has been in fore\background since the last monitoring of this application was started;
minutes since application's last active\modified time.

The following features are additionally extracted in another embodiment of the invention:

number of total\concurrent connections of the application;
number of sent\received TCP\UDP packets;
number of sent\received TCP\UDP payload bytes;
number of sent\received TCP segments.

The extraction time period is a configurable parameter. For the initial experiments with the system described herein below, it was set to 5 seconds, however it is subject to change according to the results of future evaluation experiments.

The purpose of the Features Aggregation module (32) is to provide a concise representation of the extracted application's traffic data. For this purpose, a list of various aggregation functions is defined. The instances of the aggregated data are used to induce machine-learning models representing an application's behavior and for further anomalies detection. To get a notion of the usefulness of the various features, an extended list of possible aggregated features is defined and evaluated. Below is a list of all the currently defined and aggregated features:

Average, standard deviation, minimum, and maximum of sent\received data in bytes;
Average, standard deviation, minimum, and maximum of sent\received data in percent;
Percent of sent\received bytes;
Time intervals between send\receive events—the send\receive events that occurred within the time interval of less than 30 seconds from the previous corresponding event contribute to the calculation of the inner average send\receive time interval. The events that occurred within the time interval above or equal to 30 seconds from the previous corresponding event contribute to the calculation of the outer average send\receive time interval. Additionally, two types of intervals; local—for each specific aggregation time period, and global—averaged over the whole monitoring process, were calculated. The local time intervals describe an application's behavior at certain monitoring time points, while the global time intervals describe the application's general behavior observed up until the current point of time;

Network state—Cellular, WiFi, none or mixed. The mixed state was determined in the case where several different states (i.e., Cellular and WiFi) were observed during the same aggregation period;

Minutes past since application's last send\receive data event;

Application state 1—foreground, background or mixed. Mixed state was determined in the case where several different states were observed during the same aggregation period;

Application state 2—active, non-active or mixed';

Total and local time (in seconds) for which the application was in the fore\background state. Local time may vary from 0 to 60 seconds and represent the value specific for the current aggregation interval, while the total time is aggregated over the whole application's active time period;

Minutes past since the application's last active time;

Days past since application's last modified time determined according to the application's installer file (i.e., ".apk" for Android) modification time.

Similar to the extraction, the aggregation time period is a configurable parameter and it was set to 1 minute.

One of the main goals of the invention is to learn user specific network traffic patterns for each application and determine if meaningful changes occur in the application's network behavior. This task relates to the family of semi-supervised anomaly detection problems, which assumes that the training data has samples for "normal" data examples only. For the purpose of the present invention, the semi-supervised learning problem is converted into a set of supervised problems for which numerous well established and time efficient algorithms exist. For this purpose we follow the "cross-feature analysis" approach presented in [9], and then further analyzed by [13].

The main assumption underlying the "cross-feature analysis" approach is that in normal behavior patterns, strong correlations between features exist and can be used to detect deviations caused by abnormal activities. Thus, "cross-feature analysis" learns and explores the mutual correlations existing among different features. The basic idea of a cross-feature analysis method is to explore the correlation between one feature and all the other features. Formally, it tries to solve the classification problems $C_i: \{f_1, \ldots, f_{i-1}, f_{i+1}, \ldots, f_L\} \rightarrow \{f_i\}$, where $\{f_1, f_2, \ldots, f_L\}$ in is the features vector and L is the total number of features. Such a classifier is learned for each feature i, where i=1, ... L. Thus, an ensemble of learners for each one of the features represents the model through which each features vector will be tested for "normality".

The anomaly detection module (34) is responsible for the online analysis of an application's network behavior and the detection of deviations from normal patterns. When a feature's vector representing a normal event is tested against $C_i$, there is a higher probability for the predicted value to match (for discrete features) or be very similar (for numeric features) to the observed value. However, in the case of a vector representing abnormal behavior, the probability of such a match or similarity is much lower. Therefore, by applying all the features models to a tested vector and combining their results, a decision about vector normality can be derived. The more different the predictions are from the true values of the corresponding features, the more likely that the observed vector comes from a different distribution than the training set (i.e., represents an anomaly event).

For each predictor $C_i$ the probability of the corresponding feature value of a vector x to come from a normal event is computed. This probability, noted $P(f_i(x)$ is normal), is calculated as $1 - \text{distance}(C_i(x), f_i(x))$, where $C_i(x)$ is the predicted value and $f_i(x)$ is the actual observed value. The distance between two values for a single continuous feature is the difference in values divided by the mean of the observed values for that feature. If the difference is higher than mean value, the distance is assigned with a constant large value (such as 0.999). The distance for a discrete feature is the Hamming distance (i.e., 1 if the feature values are different and 0 if they are identical).

To get the total probability of a vector x to represent an normal event, a naive assumption about the sub-model's independence is made and then all the individual probabilities computed for each one of the feature values are multiplied. A threshold distinguishing between normal and anomalous vectors is learned during algorithm calibration on the data sets with labeled samples.

However, detection of abnormality in a single observed instance is not sufficient to determine whether that application's behavior has been meaningfully changed. Such sole anomalies can be caused by changes or noise in a user's behavior. In order to reduce the False Alarms rate and improve the effectiveness of the invention in general, a procedure which considers the consequent observations and derives a decision comprised of the individual predictions for each one of these observations is defined. For example, an alarm can be dispatched only when an anomaly was detected in a certain number of consequent instances (i.e., 3 consecutively observed instances were detected as anomalous) or when an anomaly was detected in a certain percent of instances during a specified time period (i.e., 3 or more anomalies during a 10 minute interval).

The invention is currently implemented for Android devices. However it can be also applied on other mobile operation platforms and on the network units as well, because its performance is based on network features alone.

EXAMPLES

The following examples are two-dimensional graphs of traffic patterns observed while analyzing data of several popular mobile applications with heavy network usage.

Example 1

FIGS. 3A-6B show data analysis of network behavior for the popular applications Facebook (FIG. 3A and zoomed 3B), Skype (FIG. 4A and zoomed 4B), Gmail (FIG. 5A and zoomed 5B) and WhatsApp (FIG. 6A and zoomed 6B) on the devices of different users. The graphs are presented in average sent vs. average received bytes (the distinguishable patterns of each application are clearly highlighted). The data points of different users are plotted in different shapes.

As can be seen from the graphs, each one of the analyzed applications has its own specific traffic pattern which is easily distinguishable from other applications (on each of the graphs, the axis value's range is different). Additionally, other features can be utilized for differentiation in less certain cases.

Example 2

FIGS. 7A-8B show the behavior of different applications of the same type.

Figure 7A:
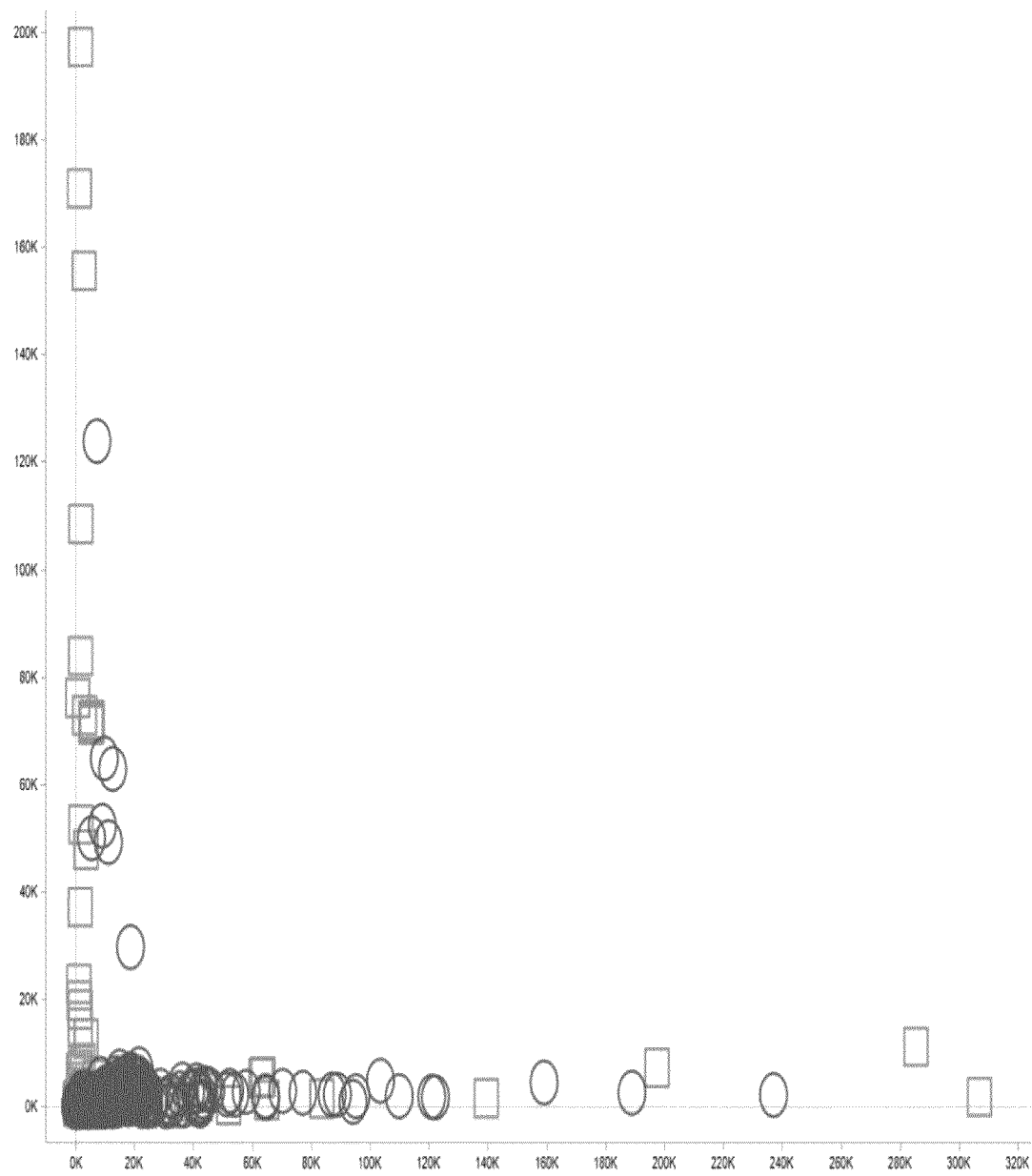
FIGS. 7A-8B show examples of the behavior of similar type applications.
Figure 7B:
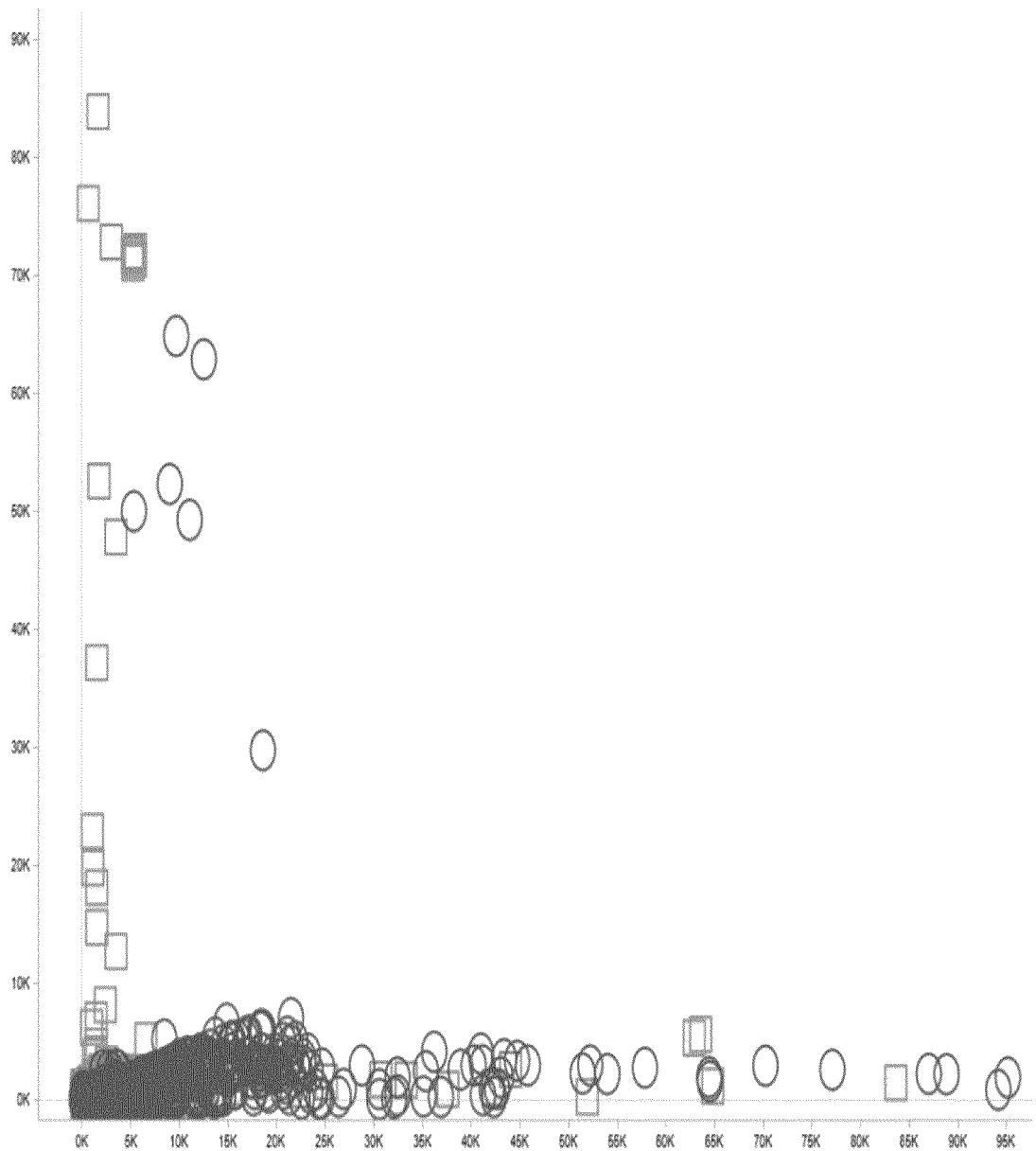
Figure 8A:
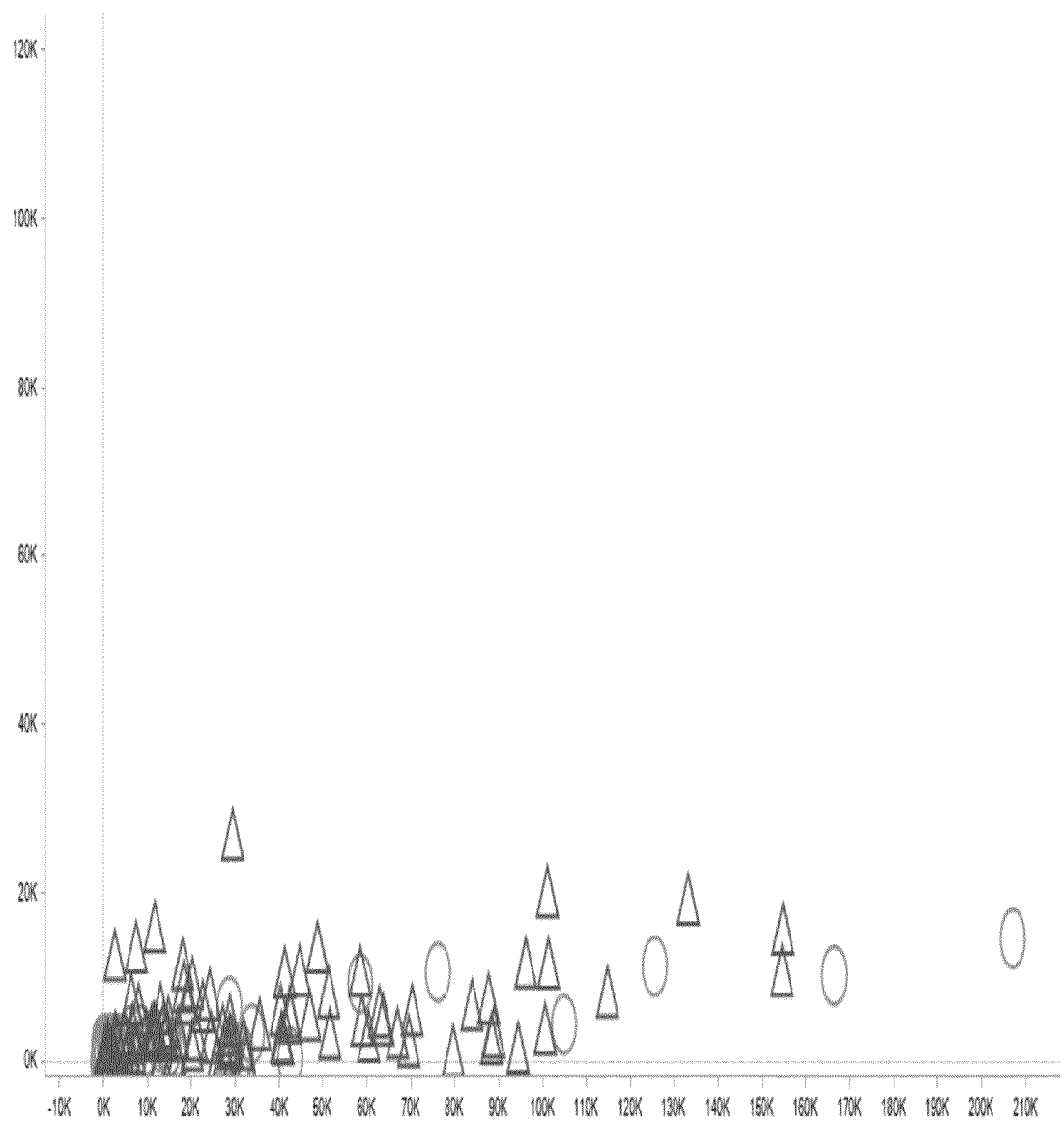
Figure 8B:
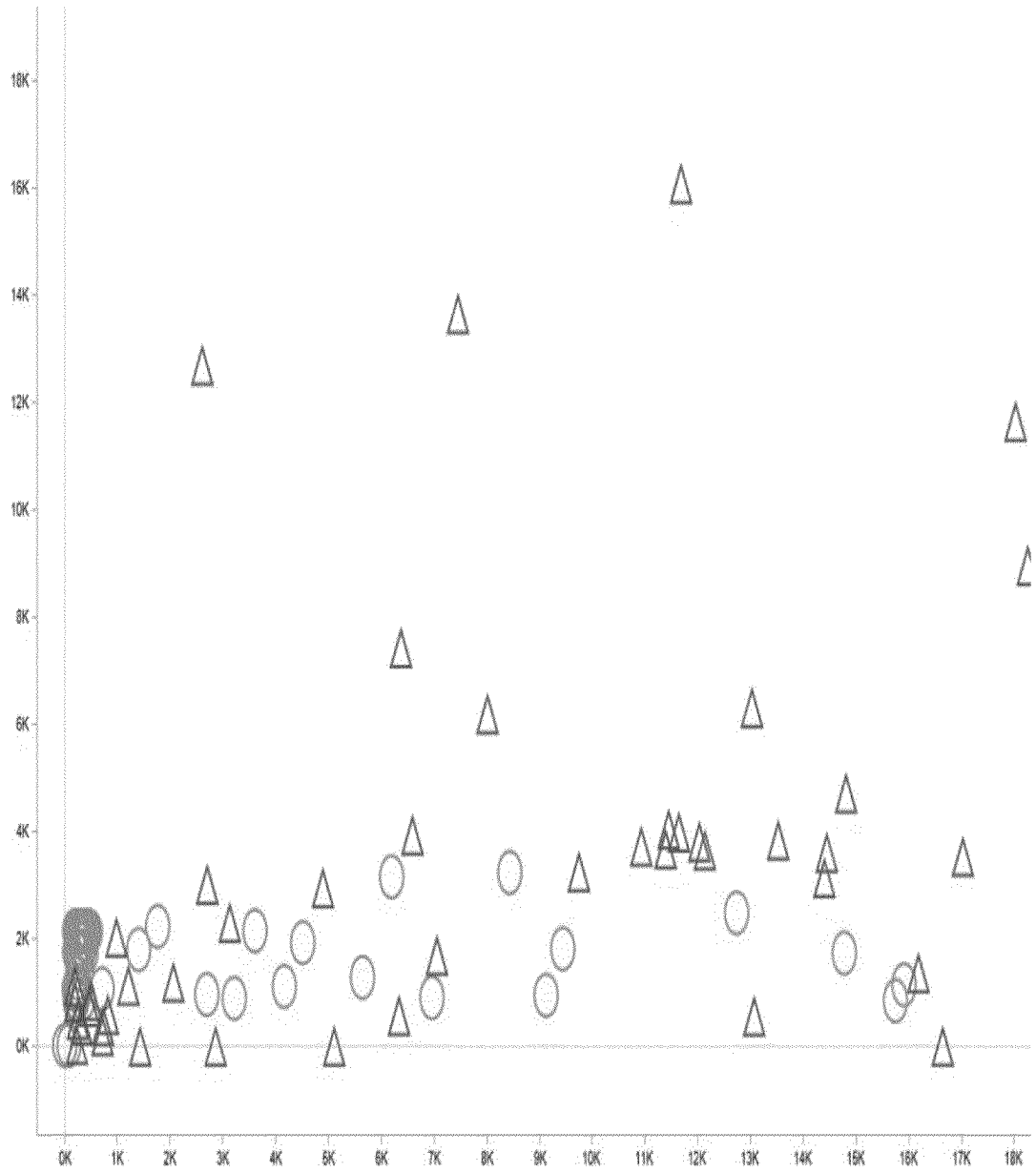

FIG. 7A depicts the traffic pattern of two e-mail client applications: Gmail and Android's native Email client. FIG. 7B shows a zoom on the graph of FIG. 7A. FIG. 8A depicts the traffic pattern of two Internet browsers: Mozilla Firefox and device's native Browser application. FIG. 8B shows a zoom on the graph of FIG. 8B. The graphs are presented in average sent vs. average received bytes (the distinguishable patterns of each application are clearly highlighted). The data points of different users are plotted in different shapes.

It can be seen from the graphs that different applications from the same functionality type have very similar traffic patterns among them, while the traffic patterns of different types of applications are different.

Based on the observations of the examples above, the following features of the invention are confirmed:
- Modeling a mobile application's network behavior using application-level features only is possible;
- Applications have certain patterns of their normal behavior, which can be learned so that any meaningful deviations from these patterns would be detected;
- The observed network behavior of an application can be used to determine whether this application is what it claims to be, given that normal patterns of this application are known;
- Certain types of applications have similar network traffic patterns which can be used, for example, for traffic classification or hierarchical clustering of applications.

Evaluation

The calibration of the system serves several purposes: 1) selection of optimal features subset, 2) evaluation of several machine-learning algorithms as base learners, 3) determination of the minimal sufficient training set size, and 4) determination of the strategy for raising the "Anomaly" alarm in case one or more anomalous records are detected.

For evaluation of different classification algorithms and selection of features, the following standard measures are employed: True Positive Rate (TPR) measure (also known as Detection Rate), which determines the proportion of correctly detected changes from an application's normal behavior; False Positive Rate (FPR) measure (also known as False Alarm Rate), which determines the proportion of mistakenly detected changes in an actually normal application behavior; and Total Accuracy, which measures the proportion of a correctly classified application behavior as either anomalous or normal.

The purpose of testing the system was to evaluate the ability of the invention to distinguish between benign and malicious versions of the same application and between two benign yet different versions of the same application. Additionally, the low False Alarm rate on the data records of the same application version was verified.

For the calibration, a set of 16 datasets were extracted and prepared from the collected data (where the Features Extraction module was installed and ran on the personal Android devices of eight volunteer users, having from 2 weeks up to 3 months of data for each user). Each one of the 16 datasets consists of training and test records. In half of the datasets (i.e., in 8 datasets) both the training and test records are taken from the same version of a certain application. These datasets are used to verify a low detection rate on the records of the same application and determine the deviation level in traffic patterns that can be attributed to the application diversity and changes in a user's behavior. In the other 8 datasets, training and test records are taken from different versions of a certain application. These datasets are used to verify the higher detection rate than seen in the cases with the same application version. However, in some cases, the low detection rate for the different application versions is acceptable, as different application versions are not obligated to contain any network related updates.

For both, the calibration and testing of the system, the training size for all applications was limited to the maximum of 150 instances, and the test size to the maximum of 400 instances. On datasets with fewer available examples, the full training and test sets are utilized.

The initial set of defined aggregated features includes above 50 attributes. Extraction and aggregation of a large number of features on a mobile device is a very inefficient and resource wasting process. Additionally, learning classification models and detection with a large number of features is much more computationally expensive. Furthermore, the presence of redundant or irrelevant features may decrease the accuracy of the learning algorithm. Therefore, the purpose in the features selection is to identify a minimal set of the most useful features. There are several groups of features among the defined list of aggregated features for which extraction and calculation is performed together using the same amount of resources. Thus, reducing one or a few features from such a group, while at least one feature from such a group has to be calculated, will not reduce the extraction and calculation overhead significantly. The standard approaches for features selection, such as Filter and Wrapper, are not applicable in this case, as they cannot consider the above described constraints between the features. For this reason, twenty feature subsets of various sizes and containing various groups of features were manually defined. The threshold distinguishing between the normal and anomalous vectors is defined separately for each one of the features subset in the preliminary calibration, as it depends on the number and type of the involved features.

Considering the prevalence of numerical attributes among the defined aggregated features, and the resource consumption issue, the following classifiers were evaluated as candidates for the base-learner algorithm: Linear Regression, Decision Table, Support Vector Machine for Regression, Gaussian Processes for Regression, Isotonic Regression, and Decision/Regression tree (REPTree). The Weka open source library [23] was used for evaluation of these algorithms. All the defined feature subsets were tested with all the evaluated base learning algorithms on the calibration datasets described above.

As previously mentioned, sometimes abnormal instances can be caused by either changes in a user's behavior or by diversity in an application's functionality. In order to determine the acceptable rate of such abnormal instances in a normal application's behavior, the possible range between 5 and 25 percent with step of 5 was evaluated. Thus, the results of all the tested algorithms and feature subsets were evaluated for 5 different "anomaly acceptance" rates; 5, 10, 15, 20, and 25.

The results of the calibration reveal the two best combinations of the base learning algorithm and features subset. The two best base algorithms are the Decision Table and the REPTree. The two best features subsets, presented in Table 1, are very similar to each other; one of the subsets includes all the features from another plus two additional features.

TABLE 1

Selected features subsets

| Features Subset #1 | Features Subset #2 |
| --- | --- |
| Avg. Sent Bytes | Avg. Sent Bytes |
| Avg. Rcvd. Bytes | Avg. Rcvd. Bytes |
| Pct. Of Avg. Rcvd. Bytes | Pct. Of Avg. Rcvd. Bytes |
| Inner Avg. Send Interval | Inner Avg. Send Interval |
| Inner Avg. Rcvd. Interval | Inner Avg. Rcvd. Interval |
| Outer Avg. Send Interval | Outer Avg. Send Interval |
| Outer Avg. Rcvd. Interval | Outer Avg. Rcvd. Interval |

TABLE 1-continued

Selected features subsets

| Features Subset #1 | Features Subset #2 |
|---|---|
| — | Avg. Sent data Percent |
| — | Avg. Rcvd. data Percent |

As can be seen from the Table above, there are seven features included in both of the best subsets. Therefore, these features are the most useful for modeling application's network traffic.

As for the estimated algorithm accuracy performance, the Decision Table algorithm in conjunction with the features subset #1 and "anomaly acceptance" rate 20 percent results in TPR=0.8, FPR=0, and Total Accuracy=0.875 and the REPTree algorithm in conjunction with the features subset #2 and "anomaly acceptance" rate 25 percent demonstrates exactly the same accuracy values.

For a better insight into the detection rate observed in the calibration datasets, the results of the Decision Table algorithm in conjunction with the features subset #1 and the REPTree algorithm in conjunction with the features subset #2 are presented in Table 2 (errors are marked in underlined bold and italic font).

TABLE 2

Detection rate on calibration datasets

| | Detected anomalous records (%) | |
|---|---|---|
| Application Name | Decision Table | REPTree |
| *Different application versions* | | |
| twitter | 60.9 | 91.3 |
| groupme | 74.5 | 82.9 |
| gmail | *__5.0__* | *__11.9__* |
| facebook | 25.8 | *__17.3__* |
| twitter | *__1.6__* | 26.0 |
| firefox | 26.8 | 32.8 |
| whatsapp | 29.2 | 44.4 |
| linkedin | 32.0 | 48.0 |
| *Same application version* | | |
| twitter | 0.0 | 6.7 |
| facebook | 1.3 | 3.9 |
| groupme | 6.7 | 10.0 |
| gmail | 16.0 | 8.0 |
| twitter | 1.0 | 14.0 |
| firefox | 20.0 | 20.0 |
| whatsapp | 7.5 | 13.5 |
| whatsapp | 10.5 | 6.5 |

It can be seen that for most of the different application versions the detection rate is above the determined "anomaly acceptance" rate of 20-25 percent for both algorithms. At the same time, the detection rate on the test sets from the same application version is always below 20 percent. Thus, the detection strategy consisting of several steps can be defined as follows: 1) raise the "Anomaly Alarm" if at least 3 consecutive abnormal instances are detected, 2) raise the "Anomaly Alarm" if at least 3 abnormal instances are detected among the five consecutive observations, 3) raise the "Anomaly Alarm" if at least 3 abnormal instances are detected among the ten consecutive observations. According to this strategy, a system will raise an alert about any meaningful changes in an application's network patterns, including those caused by a version update. Further on the version update can be verified within the mobile OS and the Alert with the relevant information (including abnormal instances rate, whether a version update was detected and when) can be presented to the user.

An important question regarding the proposed detection system is how quickly the detection can be started (i.e., how many examples are needed for sufficient learning of the network traffic patterns)? To answer this question the two algorithms that gave the best results were evaluated using train sets of various sizes. This experiment was executed on all the calibration datasets, varying the training set size from 10 to 100 or the maximum of the available instances with step 10, and from 100 to 400 with steps of 25.

The results with both algorithms show that, in most cases, the training size of 30-50 examples is sufficient for learning a stable model which is able to determine the level of deviation between an application's traffic patterns correctly. However in several cases, for such diverse applications like Facebook and Gmail, a larger amount, such as 80-150 examples, is needed for learning a stable model. Considering the fact that in the experiments each data instance represents one minute of an application's network usage, the conclusion is that a relatively short time, varying from 30 minutes to 2.5 hours of network activity is required for the system to learn the patterns of a new application. Certain applications with rare network usage may actually require much longer time, while the required amount of network behavior data is aggregated.

To test the proposed system, a set of other 12 datasets, 6 with training and test records from the same application version and 6 with training and test records from different application versions, was used. Additionally, the system was tested with one self-written and five real malware applications. For the tests with the real malware, five infected applications and their benign versions were utilized. The infected applications and the corresponding versions of the benign application were retrieved from a repository collected by crawling the official and various alternative Android markets for over a year and a half. Two applications were injected with PJApps [20] Trojan; Fling and CrazyFish, two applications injected with Geinimi [21] Trojan; Squibble Lite and ShotGun, and one sample of DroidKungFu-B [11] malware found within the OpenSudoku game.

The PJApps Trojan, which was discovered in applications from unofficial Android marketplaces, creates a service that runs in the background, sends sensitive information containing the IMEI, Device ID, Line Number, Subscriber ID, and SIM serial number to a web server, and retrieves commands from a remote command and control server.

The Geinimi Trojan arrives on the device as part of repackaged version of legitimate applications. The applications repackaged with Geinimi Trojan have been found in a variety of locations, including unofficial marketplaces, file-share sites, and miscellaneous websites. When installed, the Trojan attempts to establish contact with a command and control server for instructions and once the contact is established, it transmits information from the device to the server and may be instructed to perform certain actions.

The DroidKungFu-B is a version of the DroidKungFu malware. The DroidKungFu-B version targets already rooted phones and requests for the root privilege. In either case (with or without the root privilege), the malware collects and steals the phone information (e.g., IMEI, phone model, etc.).

The detection rate of the Decision Table and REPTree algorithms in conjunction with the features subset #1 and #2 correspondingly, on the evaluated datasets are presented in Table 3 (detection errors are marked in underlined bold and italic font).

TABLE 3

Detection Rate on test datasets

| | | Detected anomalous records (%) | |
|---|---|---|---|
| | Application Name | Decision Table | REPTree |
| | | Different versions | |
| Regular applications | twitter | 57.8 | 62.2 |
| | twitter | 78.2 | 34.8 |
| | facebook | *0.5* | *3.3* |
| | groupme | 80.9 | 87.2 |
| | whatsapp | *16.7* | 28.9 |
| | | Same version | |
| | groupme | 0.0 | 0.0 |
| | groupme | 0.0 | 15.0 |
| | gmail | 14.8 | 22.2 |
| | facebook | 16.0 | 15.7 |
| | firefox | 20.0 | 22.8 |
| | | Self-written malware | |
| Malware applications | Snake | 100.0 | 100.0 |
| | | Real malware | |
| | Fling | 63.6 | 66.8 |
| | OpenSudoku | 100.0 | 100.0 |
| | ShotGun | 97.0 | 89.5 |
| | Squibble | 90.0 | 95.0 |
| | Crazy Fish | 100.0 | 100.0 |

It can be seen that for all the malware applications, the high level deviations (60-100%) were detected. Furthermore, deviations at various levels were detected in most cases when the learned models were tested with instances from a different application version. The undetected versions of Facebook and WhatsApp applications can be explained by very few or no network-related changes in the considered application versions. Additionally, the detection rate for all the cases when the learned models were tested with instances from the same application version are below the defined "anomaly acceptance" rate of 20 percent for the Decision Table algorithm and of 25 percent for the REPTree algorithm. Thus, using the Decision Table algorithm's "anomaly acceptance" rate of 20 percent, the estimated method's accuracy on the test data is the following: TPR=0.82, FPR=0.0 and Total Accuracy=0.875. For the REPTree algorithm with the determined "anomaly acceptance" rate of 25 percent, the estimated accuracy on the test data is even higher: TPR=0.91, FPR=0.0, and Total Accuracy=0.94.

Considering the surprisingly high detection rate in the several real malware applications, in the self-written malware the 100% detection rate is not surprising, as the benign and malicious versions are significantly different in their network usage patterns. However, in the case of the real malware applications, the 100% detection rate is not obvious. In the applications infected with the Trojans, the main application's functionality is preserved and some new functionality is added. Thus, some part of the data related to the old functionality might be expected to remain unchanged. This is actually the case with the Fling application where online mobile advertisements are displayed while the application is in the phone's frontend in both versions. Thus, the records corresponding to the time when the game was actually played were less affected by the Trojan functionality and thus the observed detection rate is "only" 60%. Analysis of the data aggregated from the benign and malicious versions of the evaluated applications shows that the significant differences are caused by a background process that is running even when an application is not active and performs multiple connections (or connection attempts) with the server at constant time intervals. This behavior has a significant effect on such features, such as avg. sent\received bytes, number of sent\receive events, global outer\inner sent\receive intervals, and others. Most of the mentioned and significantly influenced features are contained in the utilized features subsets and this explains the high detection rate.

To evaluate the overhead caused by the learning and detection processes on mobile phone resources in terms of memory consumption, CPU load, and time needed for a model's induction and vector testing processes, experiments were performed on a Samsung Galaxy S GT-i9000 running Android OS version 2.2. One of the selected combinations, the REPTree algorithm in conjunction with the features subset #2, was used for the overhead evaluation experiments.

Online monitoring is performed for network-active applications only. Generally there are no more than 2-3 such applications running simultaneously on a device most of the time. Additionally, during the time periods of a user's normal activity, the number of such applications may reach no more than 10-15 network-active concurrent processes. Thus, for performance estimation, a scenario of 10 concurrently monitored applications is considered. The memory and CPU load were estimated for learning the 10 application models and further constant monitoring of their network traffic. For a better estimation of memory consumption, the results were averaged through 10 distinct experiments.

The memory consumption of the application changes in intervals from 7,035 KB±8 before the learning process has started to 7,272 KB±15 after storing the 10 learned models in memory (which is approximately 1.4% of the device's RAM). Storage of each additional model in memory consumes about 24 KB±0.7 on average. For comparison the memory consumption observed for several constantly running Android services and other popular applications is presented below: Android System—24,375 KB; Phone Dialer—8,307 KB; Antivirus—7,155 KB; TwLauncher—22,279 KB; Email—10,611 KB; and Gmail—9,427 KB. The detection process has no effect on the consumed memory.

The CPU consumption peaks occurred at the times of the actual model's learning and were in the interval of 13%±1.5. The model's learning operations occur very rarely, either when a new application is installed or when a model's update is needed (due to a new application version or changes in user's behavior). The CPU consumption observed during the process's idle time was in the interval of 0.7%±1.02. Time needed to learn a model (using 50 training examples) varies in intervals of 249 msec.±27.4.

The time needed for testing a single instance varies in intervals 3.6 msec.±2.5. Aggregated features vectors are tested once at the defined aggregation time interval (one minute for these experiments). The CPU consumed by testing 10 concurrent instances (one for each one of the assumed active applications) varies in intervals of 1.8%±0.8.

The results of this experiment depict the resources' overhead caused during the user's high activity time periods. During the, presumably much longer, time periods of the user's normal activity, an even lower overhead is expected.

Although embodiments of the invention have been described by way of illustration, it will be understood that the invention may be carried out with many variations, modifications, and adaptations, without exceeding the scope of the claims.

BIBLIOGRAPHY

[1] Amer, S., Hamilton, J. 2010. Intrusion Detection Systems (IDS) Taxonomy—A Short Review", *Defense Cyber Security*, 13 (2).

[2] Burguera, I., Zurutuza, U. and Nadjm-Tehrani, S. 2011. Crowdroid: Behavior-Based Malware Detection System for Android. In *Proceedings of the 1st Workshop on Security and Privacy in Smartphones and Mobile Devices*, CCSSPSM'11.

[3] Chandola, V., Banerjee, A. and Kumar, V. 2009. Anomaly detection: A survey. *ACM Comput. Surv.* 41(3):1-58.

[4] Cheng, J., Wong, S. H., Yang, H., Lu, S. 2007. SmartSiren: virus detection and alert for smartphones. *In Proceedings of the Fifth International Conference on Mobile Systems, Applications and Services*.

[5] Eagle, N. and Pentland, A. S. 2006. Reality mining: Sensing complex social systems. *Personal and Ubiquitous Computing*, 10 (4):255-268.

[6] Enck, W, Gilbert, P., Chun, B. G., Cox, L. P., Jung, J., McDaniel, P. and Sheth, A. N. 2010. Taintdroid: an information-flow tracking system for realtime privacy monitoring on smartphones. In *Proceedings of the 9th USENIX conference on Operating systems design and implementation* (Berkeley, Calif., USA, 2010). USENIX Association, 1-6.

[7] Felt, A. P, Finifter, M., Chin, E., Hanna, S. and Wagner, D. 2011. A Survey of Mobile Malware In The Wild. In *Proceedings of the 1st Workshop on Security and Privacy in Smartphones and Mobile Devices*, CCS-SPSM'11.

[8] Garcia-Teodoro, P., Diaz-Verdejo, J., Macia-Fernandez, G., & Vazquez, E. 2009. Anomaly-based network intrusion detection: Techniques, systems and challenges. *Comput. Secur.* 28(1-2), 18-28.

[9] Huang, Y.-A., Fan, W., Lee, W. and Yu, P. S. 2003. Cross-feature analysis for detecting ad-hoc routing anomalies. In *Proceedings of the 23rd International Conference on Distributed Computing Systems* (Washington, D.C., USA, 2003). ICDCS'03, IEEE Computer Society.

[10] Li, F., Clarke, N. L., Papadaki, M. and Dowland, P. S. 2010. Behaviour Profiling on Mobile Devices, *International Conference on Emerging Security Technologies*, (Canterbury, UK). 77-82.

[11] McAfee: Android/DroidKungFu.B http://home.mcafee.com/virusinfo/virusprofile.aspx?key=522721

[12] Moreau, Y., Verrelst, H., Vandewalle, J. 1997. Detection of mobile phone fraud using supervised neural networks: a first prototype. In: *Proceedings of the Seventh International Conference on Artificial Neural Networks*.

[13] Noto K, Brodley C, Slonim D. 2010. Anomaly detection using an ensemble of feature models. In: *Proceedings of the 10th IEEE international conference on data mining*.

[14] Portokalidis, G., Homburg, P., Anagnostakis, K. and Bos, H.2010. Paranoid android: versatile protection for smartphones. In *Proceedings of the 26th Annual Computer Security Applications Conference*, (New York, N.Y., USA, 2010). ACM, 347-356.

[15] Schmidt, A. D., Schmidt, H. G., Clausen, J., Yüksel, K. A., Kiraz, O., Camtepe, A. and Albayrak, S. 2008. Enhancing security of linux-based android devices. In *Proceedings of 15th International Linux Kongress*.

[16] Schmidt, A. D., Peters, F., Lamour, F., Scheel, C., Camtepe, S. A., Albayrak, S. 2009. Monitoring smartphones for anomaly detection. *Mobile Netw. Appl.* 14 (1), 92-106.

[17] Shabtai, A., Kanonov, U. and Elovici, Y. 2010. Intrusion detection for mobile devices using the knowledge-based, temporal abstraction method. *J. Syst. Softw.* 83:1524-1537.

[18] Shabtai, A., Kanonov, U., Elovici, Y., Glezer, C. and Weiss, Y. 2011. Andromaly: a behavioral malware detection framework for android devices. *J. Intell. Inf Syst.* 1-30, 10.1007/s10844-010-0148-x.

[19] Shamili, A. S., Bauckhage, C. and Alpcan, T. 2010. Malware detection on mobile devices using distributed machine learning. In *Proceedings of the 20th International Conference on Pattern Recognition* (Washington, D.C., USA, 2010). ICPR'10, IEEE Computer Society, 4348-4351.

[20] Symantec: Android.Pjapps http://www.symantec.com/security_response/writeup.jsp?docid=2011-022303-3344-99&tabid=2

[21] Symantec: Android.Geinimi http://www.symantec.com/security_response/writeup.jsp?docid=2011-010111-5403-99&tabid=2

[22] Qian, F., Wang, Z., Gerber, A., Mao, Z., Sen, S. and Spatscheck, O. 2011. Profiling resource usage for mobile applications: a cross-layer approach, In *Proceedings of the 9th International Conference on Mobile Systems, Applications, and Services* (Bethesda, Md., USA).

[23] Weka 3: Data Mining Software in Java http://www.cs.waikato.ac.nz/ml/weka/

The invention claimed is:

1. A method for protecting a mobile communication device in a cellular network from unauthorized harmful applications, wherein the mobile communication device comprises electronic circuits, a processor, local data storage units, a graphical user interface (GUI), and a traffic detection application installed on the mobile communication device; the method comprising:
   a) executing Registration software in the traffic detection application to activate the processor to extract from a local storage unit a list of all applications installed on the mobile communication device and mobile communication device identifiers;
   b) executing Configuration Manager software in the traffic detection application to activate the processor to receive and load in a local storage unit configuration parameters;
   c) executing Logging software in the traffic detection application to activate the processor to record in a local storage unit specified events in log files on the mobile communication device;
   d) executing Features Extraction Manager software in the traffic detection application to manage extraction, aggregation and learning processes according to defined time intervals by:
   i) executing Features Extraction software in the traffic detection application to activate the processor to perform measurement of defined features at defined time periods and to store the measurements in a Features storage unit;
   ii) executing Features Aggregation software in the traffic detection application to activate the processor to compute and store in the Features storage unit defined aggregations over all the extracted measurements for the specified time period;
   iii) executing Local Learner software in the traffic detection application to activate the processor to induce from the defined aggregations that are stored in the Features storage unit local models representing an application's normal traffic patterns specific for the mobile communication device on which it is installed and to store the induced local models in a Models storage unit;
   e) executing Models Manager software in the traffic detection application to activate the processor to perform operations related to the models stored in the Models storage unit;
   f) executing Anomaly Detector software in the traffic detection application to activate the processor to perform online analysis of an application's network behavior and to detect deviations from normal behavior patterns; and g) executing Alerts Handler software in the traffic detection application to activate the processor to present alerts to a user on the GUI of the mobile communication device when a deviation from the normal behavior pattern of an application is detected;

wherein, all software of the application is installed and run on a single mobile communication device, to analyze network behavior of applications running on the mobile communication device and detect meaningful deviations from the application's observed normal behavior; thereby to detect previously unknown malware applications based only on the data available on the mobile communication device, independently of other mobile communication devices or servers present in the cellular network.

2. The method of claim 1, wherein the traffic detection application comprises Communication Services software, which is configured to activate components of the electronic circuits of the mobile communication device that are configured to perform communication related operations with external systems.

3. A system configured to provide improved protection of mobile communication devices in a cellular network comprising a plurality of mobile communication devices and a server from unauthorized harmful applications by sharing information that is gathered by at least two of the mobile communication devices;

wherein the at least two mobile communication devices each comprise, electronic circuits, a processor, local storage units, a graphical user interface (GUI), and a traffic detection application installed on the mobile communication device; the traffic detection application comprising:

a) Registration software configured to activate the processor to extract from a local storage unit a list of all installed applications and mobile communication device identifiers;

b) Configuration Manager software configured to activate the processor to receive and load in a local storage unit configuration parameters;

c) Logging software configured to activate the processor to record in a local storage unit specified events in log files;

d) Features Extraction Manager software configured to manage:
  i) Features Extraction software configured to activate the processor to perform measurement of defined features at defined time periods and to store the measurements in a Features storage unit;
  ii) Features Aggregation software configured to activate the processor to compute and store in the Features storage unit defined aggregations over all the extracted measurements for the specified time period;
  iii) Local Learner software configured to activate the processor to induce from the defined aggregations that are stored in the Features storage unit local models representing an application's normal traffic patterns specific for the mobile communication device on which it is installed and to store the induced local models in a Models storage unit;

e) Models Manager software configured to activate the processor to perform operations related to the models stored in the Models storage unit;

f) Anomaly Detector software configured to activate the processor to perform online analysis of an application's network behavior and to detect deviations from normal behavior patterns;

g) Alerts Handler software configured to activate the processor to present alerts to a user on the GUI of the mobile communication device; and h) Communication Services software configured to activate components of the mobile communication device to perform communication related operations with external systems; and wherein the server comprises:

a) electronic circuits, a processor, and local data storage units;

b) Communication Services components of the electronic circuits configured to establish and manage required communications with the mobile communication devices in the system;

c) User's Registration software that is configured to activate the Communication Services components of the electronic circuits to receive identification and lists of installed applications from each of the mobile communication devices in the system and to update a list of all applications installed on all of the mobile communication devices and store the lists in a User Apps data storage unit;

d) Features Distribution Manager software that is configured to activate the processor to manage a features extraction distribution process, to define and update schedules of the periods and applications to be reported by each of the at least two mobile communication devices in the system, and to verify the received information;

e) Features Acquisition software that is configured to activate the processor to acquire and store in a Features data storage unit the features data received from mobile communication devices in the system by the Communication Services components;

f) Models Learner software that is configured to activate the processor to induce collaborative models representing common traffic patterns of applications on the at least two mobile communication devices in the system and to store the collaborative models in a Models data storage unit;

g) Models Manager Software configured to activate the processor to perform operations related to the models stored in the Models storage unit;

h) Models Distributor software that is configured to activate the Communication Services components to transfer collaborative models from the Models data storage unit to each of the mobile communication devices in the system upon request by that mobile device;

i) Models-Change Detector software that is configured to activate the processor compare a newly induced collaborative model to a collaborative model for the same application that is stored in that Models data storage unit to verify if there are significant changes that require the collaborative model to be updated on mobile communication devices in the system; and j) Alerts Handler software that is configured to activate the Communication Services components to send alerts to mobile communication devices in the system, to store the alerts locally on the server, and to send relevant alerts to a system administrator.

4. The system of claim 3, wherein the models related operations comprise at least one of the following:
  a) matching of unknown patterns to existing models;
  b) deciding when to start the collaborative learning process; and
  c) storing and retrieving the models from a system database.

5. The system of claim 3 wherein the collaborative models received from the server are used by the processor and software on the mobile communication devices to perform a second comparison of an application's network behavior that appeared to be anomalous based on the mobile communication device's local model in order to either confirm or contradict the decision to issue an alert.

6. A method of using the system of claim 3 to provide improved protection of mobile communication devices in a cellular network from unauthorized harmful applications, the method comprising:
  a) employing a method for protecting a mobile communication device in a cellular network from unauthorized harmful applications, wherein the mobile communication device comprises electronic circuits, a processor, local data storage units, a graphical user interface (GUI), and a traffic detection application installed on the mobile communication device; the method comprising:
    i) executing Registration software in the traffic detection application to activate the processor to extract from a local storage unit a list of all applications installed on the mobile communication device and mobile communication device identifiers;
    ii) executing Configuration Manager software in the traffic detection application to activate the processor to receive and load in a local storage unit configuration parameters;
    iii) executing Logging software in the traffic detection application to activate the processor to record in a local storage unit specified events in log files on the mobile communication device;
    iv) executing Features Extraction Manager software in the traffic detection application to manage extraction, aggregation and learning processes according to defined time intervals by:
    v) executing Features Extraction software in the traffic detection application to activate the processor to perform measurement of defined features at defined time periods and to store the measurements in a Features storage unit;
    vi) executing Features Aggregation software in the traffic detection application to activate the processor to compute and store in the Features storage unit defined aggregations over all the extracted measurements for the specified time period;
    vii) executing Local Learner software in the traffic detection application to activate the processor to induce from the defined aggregations that are stored in the Features storage unit local models representing an application's normal traffic patterns specific for the mobile communication device on which it is installed and to store the induced local models in a Models storage unit;
    viii) executing Models Manager software in the traffic detection application to activate the processor to perform operations related to the models stored in the Models storage unit;
    ix) executing Anomaly Detector software in the traffic detection application to activate the processor to perform online analysis of an application's network behavior and to detect deviations from normal behavior patterns; and
    x) executing Alerts Handler software in the traffic detection application to activate the processor to present alerts to a user on the GUI of the mobile communication device when a deviation from the normal behavior pattern of an application is detected;
  wherein, all software of the traffic detection application is installed and run on a single mobile communication device, to analyze network behavior of applications running on the mobile communication device and detect meaningful deviations from the application's observed normal behavior; thereby to detect previously unknown malware applications based only on the data available on the mobile communication device, independently of other mobile communication devices or servers present in the cellular network;
    b) to induce and continually update machine learning models of the network behavior of applications running on each of at least two mobile communication devices on which the traffic detection application has been installed;
    c) executing User's Registration software in the server to receive identification and lists of installed applications from at least two mobile communication devices on which the traffic detection application has been installed and to update a list of all monitored applications installed on all of these mobile communication devices;
    d) executing Features Distribution Manager software in the server to manage a features extraction distribution process; to define and update schedules of the periods at which each of the at least two of the mobile communication devices on which the traffic detection application has been installed should send extracted features and/or local models of applications to the server; and to verify the received information;
    e) executing Features Acquisition software in the server to acquire and store in a features database on the server the extracted features and/or local models received from the mobile communication devices;
    f) executing Collaborative Learner software in the server to induce, continually update, and store in a collaborative model database in the server machine learning collaborative models representing the network behavior of applications from multiple users; and
    g) executing Models Distributor software in the server to transfer collaborative models upon request to a mobile communication device on which the traffic detection application has been installed.

7. The method of claim 6 wherein the collaborative models received from the network server are used by the systems on the mobile communication devices to perform a second comparison of an application's network behavior that appeared to be anomalous based on the mobile communication device's local model in order to either confirm or contradict the decision to issue an alert.

8. The method of claim 7, wherein, if anomalous behavior is confirmed, the mobile communication device on which the traffic detection application has been installed alerts its user and sends an alarm to an Alerts Handler in the server to send alerts to other mobile communication devices in the cellular network, to store the alarms locally in the server, and to send relevant alerts to a system administrator.

* * * * *